United States Patent [19]
Schwartz et al.

[11] Patent Number: 5,872,923
[45] Date of Patent: Feb. 16, 1999

[54] COLLABORATIVE VIDEO CONFERENCING SYSTEM

[75] Inventors: William C. Schwartz, Downers Grove; Catherine A. Boss, Aurora; Allison A. Carleton, Lisle; Joseph B. Cyr, Naperville; Catherine M. FitzPatrick, Winfield; J. Michael Grinn, Batavia; Paul A. Peterson, Oak Park; Theresa M. Pommier, Westmont; Krista S. Schwartz, Batavia, all of Ill.

[73] Assignee: NCR Corporation, Dayton, Ohio

[21] Appl. No.: 128,016

[22] Filed: Sep. 28, 1993

Related U.S. Application Data

[63] Continuation-in-part of Ser. No. 35,092, Mar. 19, 1993, Pat. No. 5,649,104.

[51] Int. Cl.$^6$ ............................. G06F 13/38; G06F 15/17
[52] U.S. Cl. ..................................... 395/200.35; 345/331
[58] Field of Search ................................... 395/163, 800, 395/157, 150–159, 153, 650, 200.34, 200.35; 348/12; 364/514; 370/62; 345/330, 331

[56] References Cited

U.S. PATENT DOCUMENTS

| | | |
|---|---|---|
| 5,239,373 | 8/1993 | Tang et al. . |
| 5,241,625 | 8/1993 | Epard et al. ............................. 395/163 |
| 5,375,068 | 12/1994 | Palmer et al. ........................... 364/514 |

FOREIGN PATENT DOCUMENTS

| | | |
|---|---|---|
| 410378A2 | 1/1991 | European Pat. Off. . |

OTHER PUBLICATIONS

Ohmori et al. Distributed Cooperative Control for Sharing Application Based on Multi party and Multimedia Desktop Conferency System: Mermaid IEEE; Jun. 1992; pp. 538–546.

W. J. Clark, "Multipoint Multimedia Conferencing", *IEEE Communications Magazine,* vol. 30, No. 5, May, 1992, pp. 44–50.

Toyosawa et al., "A Window Automanagement Scheme for a Multimedia–Multipoint Teleconference", *IEEE International Conference on Communications,* 1993 vol. 2/3, May 26, 1993,, Geneva Switzerland.

Dr. Thomas Kummerow, "Möglichkeiten der Multimediakommunikation", *Telenorma Nachrichten,* No. 93/N, Jun. 24, 1993 pp. 3–10.

"Display of Multiple Video Windows for Personal Conferencing", *IBM Technical Disclosure Bulletin,* vol. 36, No. 06A, Jun., 1993, pp. 45–46.

Computer Networks, Second Edition, Andrew S. Tanenbaum, Prentice Hall, Englewood Cliffs, N.J., 1989 pp. 97–98, 104.

Aring & Robinson; "Support For Informal Communication in Distributed Group Work", *Wideband Communication,* pp. 864–870.

Werner B. Korte, "Multimedia BK Technology for the Support of Distributed Group Work", *Wideband Communication,* pp. 872–878.

VISIT video, Northern Telecom brochure.

(List continued on next page.)

*Primary Examiner*—Mark H. Rinehart
*Attorney, Agent, or Firm*—Gregory A. Welte; George H. Gates

[57] ABSTRACT

A video conferencing system, wherein multiple parties at different locations can view, and modify, a common image on their computer displays. The invention also provides a video camera at each computer, which takes a video picture of each party.

The invention distributes data to all computers involved in the conference from which each computer can generate a display containing the common image, the modifications, and the video pictures.

5 Claims, 16 Drawing Sheets

OTHER PUBLICATIONS

Telegraphics Design Document Draft May 22, 1992.

"Desk Top Conferencing for Windows" Brochure by Fujitsu Networks Industry, Inc.

Moskowitz, Robert, "The Electronic Meeting" *Presentation Products Magazine,* Sep., 1990, pp. 24–32.

Piturro, Marlene C., "Computer Conferencing: Brainstorming Across Time and Space", *Management Review,* Aug., 1969, pp. 43–50.

"IBM Person to Person" Brochure, UltiMedia, IBM United States, Oct., 1991.

SMART 2000 Conferencing System Brochure, SMART Technologies Inc., Calgary, AB Canada.

DeskTop Conferencing Novell® Local Area Networks Product Description, Fujitsu Networks Industry, Inc.

Street, Apr., "Videoconferencing On Any Wire", *MacWeek,* Oct., 5, 1993.

Bartino, Jim, "At These Shouting matches, No One Says A Word" *Business Week,* Jun. 11, 1990.

Andrews, Edmund L., "Plugging the Gap Between E–Mail and Video Conferencing" *New Yrok TIme,* Sunday, Jun. 23, 1991, p. 9.

Palme, Jacob, "Distributed Computer Conferencing", Elsevier Science Publishers B.V. (North–Holland), pp. 137–145.

Kelly, John N., "Technology That Supports Meetings" *Patricia Seybold's Office Computing Report,* Sep., 1988.

Wynne, Bye, "Group Support Systems and Electronic Collaboration", American Management Association *Information Management Forum,* May, 1991.

Wynne, Bye, "Groupware and Your Future", American Management Association *Information Management Forum,* Nov., 1989.

"Texaco Contributes to Group Decision Support Services Project", Campus News, *MMR,* Summer, 1990, p. 23.

Southworth, Mason,, "How to Have an 'Electronic' Brainstrom", No. 1, 1990, pp. 12 and 13.

Richman, Louis S., "Software Catches The Team Spirit", Reprinted through the courtesy of the Editors of Fortune.

LaPlante, Alice, "Workgroup Idea Still Unclear to Users", *Info World,* Dec. 11, 1989, vol. 11, Issue 5.

"Meeting Support An Emerging Market" pp. 69–75.

Ententé, Tuenkey Electronic Classroom.

"The Year 2000: Expect Meetings to Change, Not Decline", *The 3M Meeting Management News,* vol. 3, No. 1.

LaPlant, Alice, "IBM Study: PCs Aid in Decision Process", *Info World,* vol. 11, Issue 49.

Panko, Raymond R., Presentation Patterns of Organizational Communication.

"Brainstorming by Modem", *The New York Times,* Sunday, Mar. 24, 1991.

"Study Focuses On Use Of Rules in Meetings", *The 3M Meeting Management Institute,* vol. 3, No. 3, Dec., 1991.

Johansen, Robert "Teams for Tomorrow", Institute for the Future, pp. 521–534.

Rodden, Tom, "A Survey of CSCW Systems", *Interacting with Computers,* vol. 3, No. 3 (1991) pp. 319–353.

Compression Labs, Inc. (CLI), Special Report, Aug. 20, 1993, pp. 66–69.

Preliminary Information from ShareVision Technology Inc., 1992, PPIN0992 Rev. B,.

Hoshi, Nakamura, Nakamura, "Broadband ISDN Multimedia Workstations and Group Tele–Working Systems", *Hitachi Review* vol. 40 (1991), No. 3, pp. 217–222.

Watabe, Sakata, Maeno, Fukuoka and Ohmori, "Multimedia Desktop Conferencing System: Mermaid", *NEC Research and Development* vol. 32, No. 1 pp. 158–167, Jan. 1991.

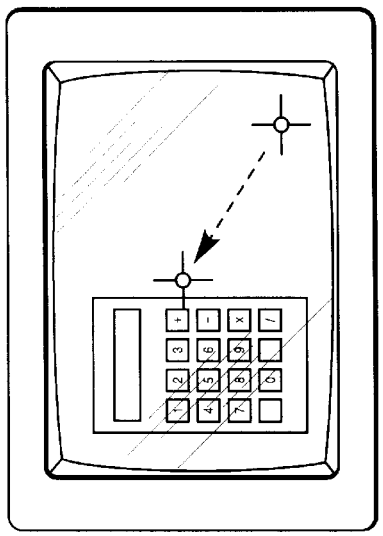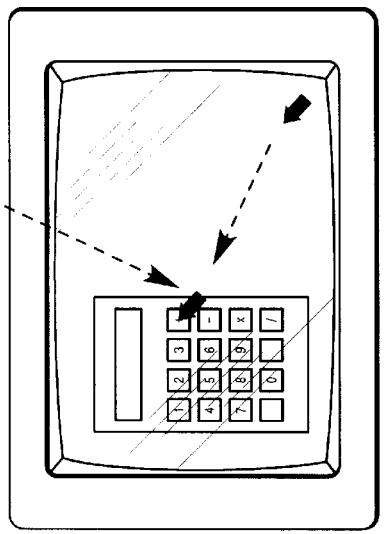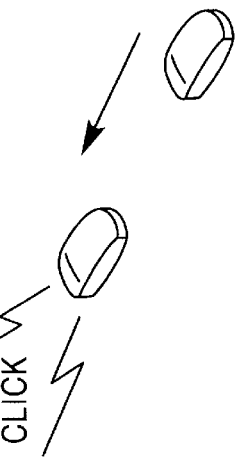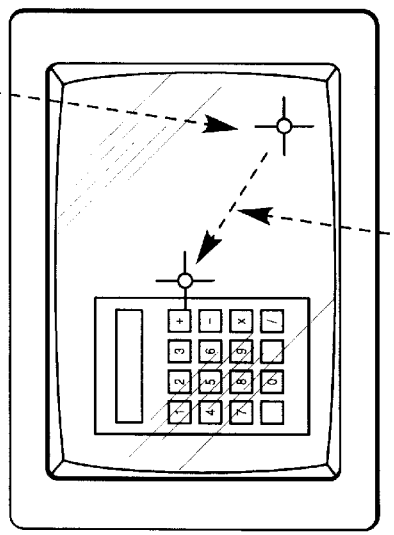
FIG. 3 — MODE: ANNOTATION

FIG. 4
MODE: ANNOTATION
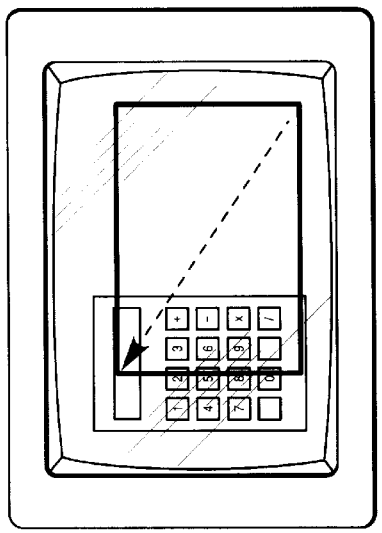
REMOTE
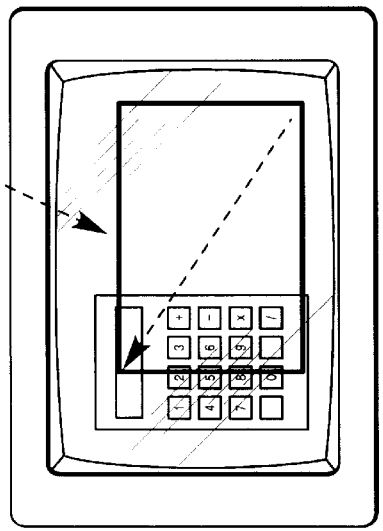
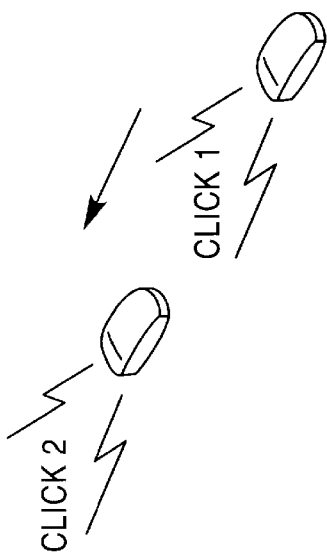
HOST
PROGRAM IS RUNNING HERE
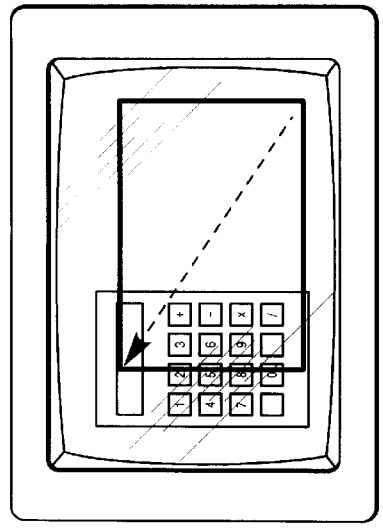
REMOTE

FIG. 5
MODE: APPLICATION
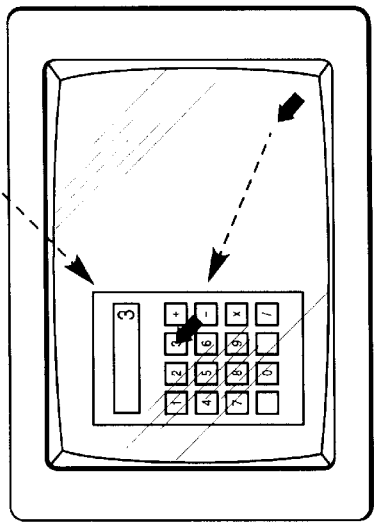
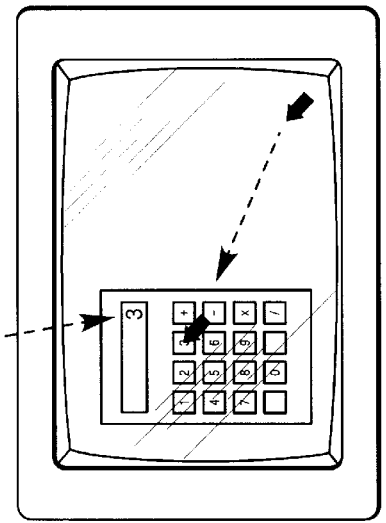
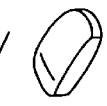
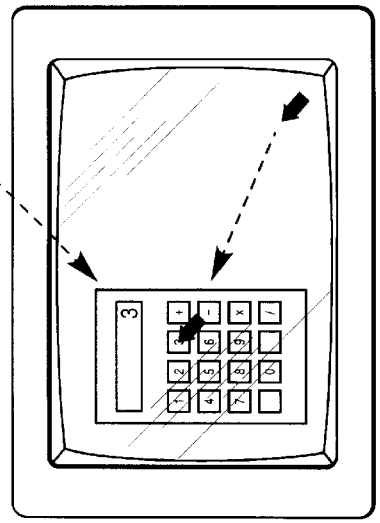
REMOTE
HOST SCREEN IS
COPIED TO REMOTES
CALCULATOR
BEHAVES NORMALLY
CLICK
HOST
PROGRAM IS RUNNING HERE
REMOTE

FIG. 11
MODE: APPLICATION
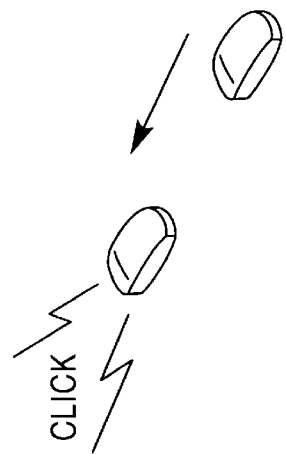
CLICK
REMOTE
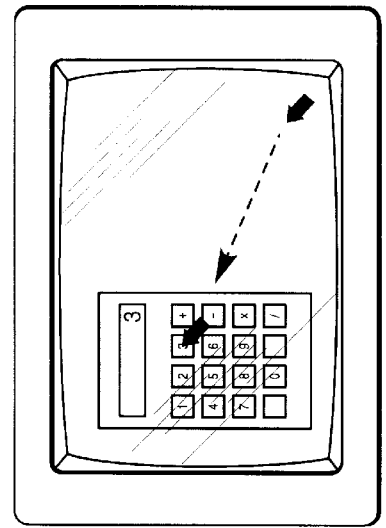
PROGRAM RUNNING ON HOST
BEHAVES AS THOUGH HOST CLICKED BUTTON
HOST SCREEN IS COPIED TO REMOTES
HOST
PROGRAM IS RUNNING HERE
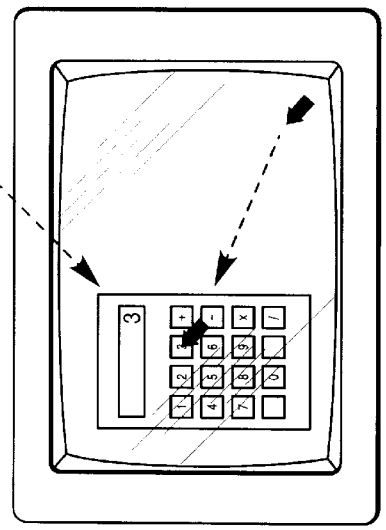
REMOTE

MODE: LOCAL ANNOTATION

MODE: VIEW

COLLABORATIVE VIDEO CONFERENCING SYSTEM

This is a continuation-in-part of application Ser. No. 08/035,092, entitled "Remote Collaboration System," by Carleton et al., filed on Mar. 19, 1993, now U.S. Pat. No. 5,649,104 and assigned to NCR Corporation, which is hereby incorporated by reference.

CROSS-REFERENCE TO RELATED APPLICATIONS

This application is related to:

Application Ser. No. 08/035,092, entitled "Remote Collaboration System," by Carleton et al., filed on Mar. 19, 1993, and assigned to NCR Corporation.

Application Ser. No. 08/035,091, entitled "Remote Collaboration System," by Fitzpatrick et al., filed on Mar. 19, 1993, and assigned to NCR Corporation.

Application Ser. No. 08/033,602, entitled "Remote Collaboration System," by Pommier et al., filed on Mar. 19, 1993, and assigned to NCR Corporation.

Application Ser. No. 08/034,313, entitled "Remote Collaboration System," by Schwartz et al., filed on Mar. 19, 1993, and assigned to NCR Corporation.

Application Ser. No. 08/123,012, entitled "Accelerated Replication of Multiple Computer Displays," by Hester et al., filed on the same date herewith, and assigned to NCR Corporation.

Application Ser. No. 08/128,013, entitled "Annotation of Computer Video Displays," by Carleton et al., filed on the same date herewith, and assigned to NCR Corporation.

Application Ser. No. 08/128,018, entitled "Direct Capture of a Video Conferencing Data," by Alonso-Cedo et al., filed on the same date herewith, and assigned to NCR Corporation.

Application Ser. No. 08/128,017, entitled "Method and Apparatus for Display of Video Images in a Video Conferencing System," by Carleton et al., filed on the same date herewith, and assigned to NCR Corporation.

Application Ser. No. 08/128,014, entitled "Palette Management for Application Sharing in Collaborative Systems," by Hester, filed on the same date herewith, and assigned to NCR Corporation.

All the above-identified applications are incorporated by reference herein.

REFERENCE TO A MICROFICHE APPENDIX

A microfiche appendix, containing five (5) microfiche and 418 total frames is filed herewith.

BACKGROUND OF THE INVENTION

Modern telephone systems allow multiple parties at different locations to hold a conference. However, telephone conferences do not provide all of the conveniences of a face-to-face conference, where participants all meet at a common table in a meeting room.

For example, in a meeting room, participants can view an object of interest, such as a drawing or a product. Such viewing is not possible in a telephone conference.

The invention concerns systems for collaborative video conferencing, using the telephone system. The invention generates a common visual image which is distributed to several computers. The users of the computers can make annotations on the common image. When they do, the invention replicates the annotations on the displays of all computers.

The common visual image can contain different types of images, such as text, graphics, and video.

OBJECTS OF THE INVENTION

It is an object of the invention to provide an improved electronic conferencing system.

It is a further object of the invention to provide a system which allows users to remotely operate a computer program.

It is a further object of the invention to provide a system which allows multiple computers to operate a single program residing on one of the computers.

It is a further object of the invention to provide a system which allows multiple computer users to view and annotate a common display.

It is a further object of the invention to provide a system in which multiple computers display a common image which contains both still images and moving, video images.

SUMMARY OF THE INVENTION

In one form of the invention, a host computer makes multiple copies of a common video image by transmitting, to other computers participating in a conference, the commands used to generate the image, rather than a bitmap of the image itself. The commands require less data than the entire bit map.

The invention also allows the host computer to transmit moving, video images to the other computers, which will be displayed on the same display as the images generated by the commands. Thus, both video and still-image data is shared via the data channel used to connect the computers.

BRIEF DESCRIPTION OF THE DRAWINGS

FIG. 3 illustrates how the invention responds when a host user attempts to operate the calculator, when the invention is in Annotation mode.

FIG. 4 illustrates how the invention responds when a host user attempts to annotate the calculator, when the invention is in Annotation mode.

FIG. 5 illustrates how the invention responds when a host user attempts to operate the calculator, when the invention is in Application mode.

FIG. 11 illustrates how the invention responds when a remote user attempts to operate the calculator, when the invention is in Application mode.

FIGS. 15 and 15A illustrate logic flow used by the invention.

DESCRIPTION OF A PREFERRED EMBODIMENT

Overview

Figure 1:
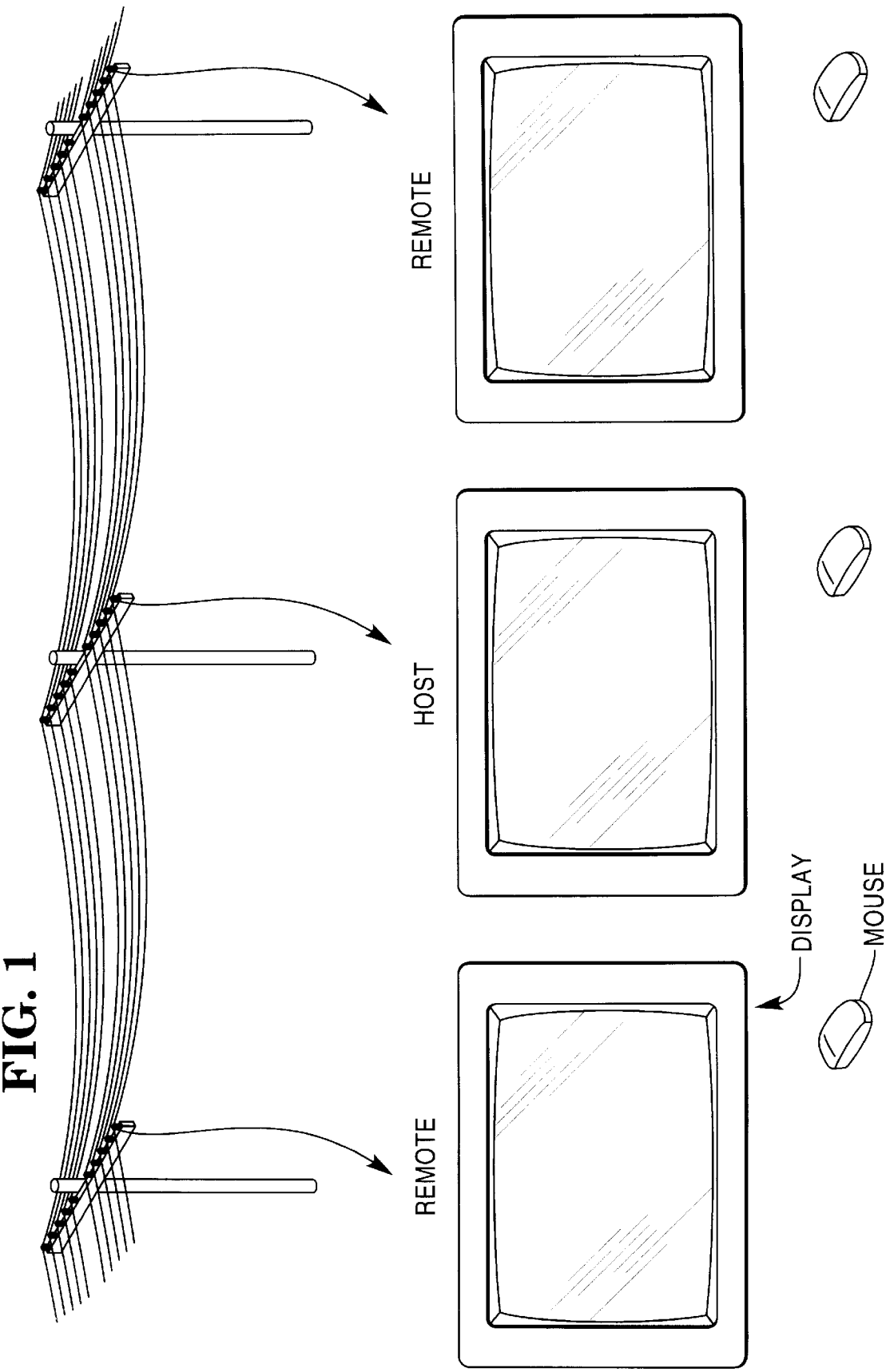
FIG. 1 illustrates three computers, connected by telephone lines.

FIG. 1 shows three computers connected by telephone links. Each computer runs a message-driven, multi-tasking, Graphical User Interface (GUI), such as that sold under the name Windows, available from Microsoft Corporation, located in Redmond, Wash. Such GUIs are also called operating environments.

The user of a GUI interacts with a program by way of windows. The invention replicates selected windows, rather than the entire display, at the remote computers. This selective replication allows users to maintain private areas on their displays, which are not shared.

Each computer also runs software developed by the inventors. In addition, one computer (the Host) runs an Application program. (It is possible for the Host to run both programs because of the multi-tasking capabilities of the GUI.)

The invention has four basic modes of operation:

1. Application Mode

Figure 2:
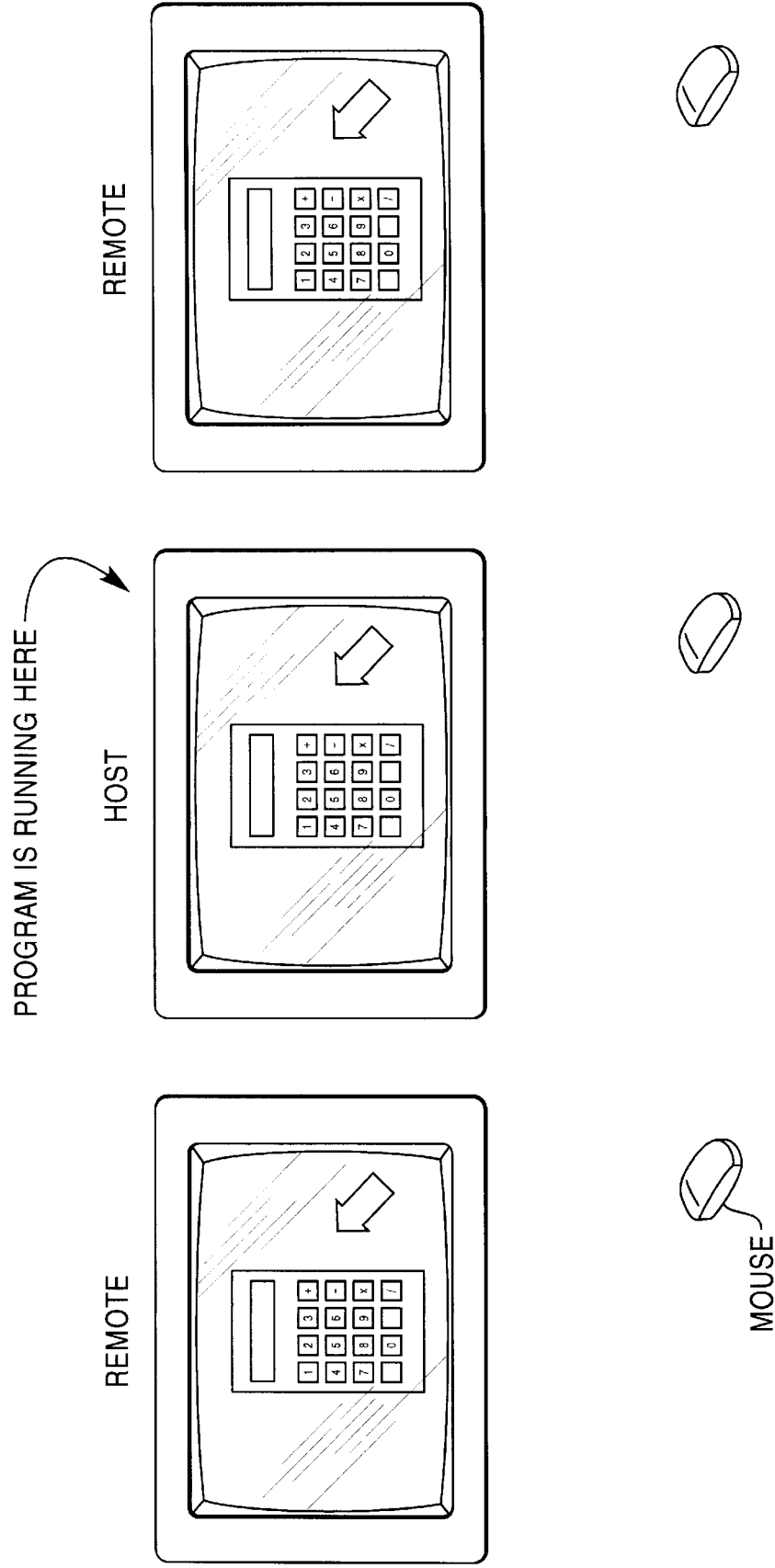
FIG. 2 initiates an example, which will be elaborated in FIGS. 3–14. In the example, a calculator program is operated, and annotated, by various parties.
Figure 6:
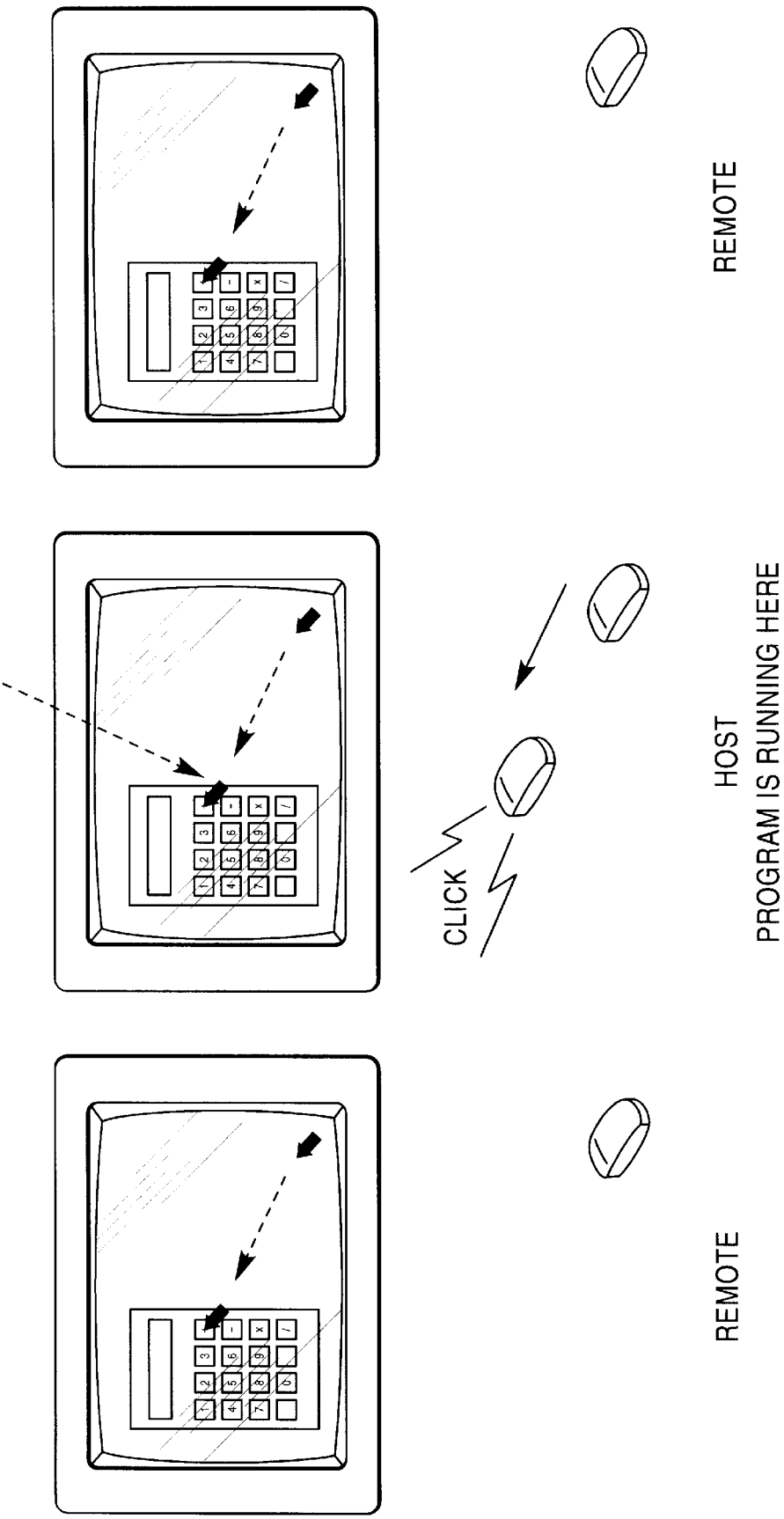
FIG. 6 illustrates how the invention responds when a host user attempts to operate the calculator, when the invention is in Local Annotation mode.

Any user of any of the three computers in FIG. 1 can issue commands to the Application program. For example, assume the Application program is one which simulates a hand-held calculator. The initial situation is shown in FIG. 2, where each computer display shows the calculator. Assume that the following events occur:

The user of the Host presses the "3" button on the calculator (either by keyboard input, or mouse input, depending upon the design of the calculator program). In response, each calculator, in its display area, shows a "3 ".

The user of one Remote presses "+".

The user of the other Remote presses "6".

The user of the Host presses "=".

At this point, all calculators will display "9", which is the sum of 3 and 6. The users collectively operated the calculator program, and the display of each shows the result.

The calculator program does not care which users pressed the buttons, nor whether some users pressed no buttons, provided a legal sequence of buttons was received. (It is assumed that the users are cooperative, and that no users try to sabotage operation of the calculator.)

2. Annotation Mode

Any user can draw on the user's own, local, display, using drawing tools similar to those found in a "paint" program. The user can draw boxes, circles, arcs, text, ellipses, and so on. The user can also erase items on the display.

The invention can replicate the user's annotations on all other displays, so that all users view similar displays. However, the displays could be different, because of the following factors:

(A) Different display monitors have different properties, such as resolution and color capability.

(B) Different display protocols (EGA, VGA, etc.) represent graphics images differently, and have different color capabilities.

(C) Different GUIs, or different versions of the same GUI, may have different display conventions. Different computers in FIG. 1 could run the different GUIs.

(D) Some users have changed the size of the window in which their calculator is displayed, causing a deviation in scaling.

These differences can cause differences in the appearance of the displayed images, relative to each other, but the basic content of all displays should be the same. To accommodate size differences, the invention draws to different scales as appropriate.

3. Local Annotation Mode

A user can annotate the local display, but the annotations are kept private, and no other user can see the annotations.

4. View Mode

No users can annotate, nor can they issue commands. However, an action resembling annotation can be taken. Users can move their cursors, and others will see the movement, allowing remote pointing. View Mode is useful in one embodiment, wherein, for example, Annotate Mode is in force, but a specific user's mode is designated as View. In this embodiment, all users can annotate, but the "View" user can only watch, and cannot annotate.

Explanation of Individual Modes

FIGS. 3–14 will illustrate the different modes, by way of example, using the calculator program.

FIG. 3

Host Runs Application Program

Mode is "Annotation"

User Input is at Host Computer

User Attempts to Operate Calculator

Assume that the user of the host computer attempts to add two numbers, using the calculator. Attempted entry of the first number will be considered.

The user, located at the Host, moves the Host's cursor over a key of the calculator, as shown in FIG. 3, and tries to depress the key, by clicking the mouse. However, the mouse click does not reach the Application program, because the invention blocks it. The Application program does not respond, because it receives no mouse click.

That is, in more detail, the GUI detects the mouse movement, and causes "mouse messages" to be generated. The GUI places the mouse messages into a queue, where they await processing. INPUT ROUTER in FIG. 15 reads these messages. Because "Annotation Mode" is currently in force, INPUT ROUTER directs the messages to the ANNOTATION block. APPLICATION does not receive the messages, and thus does not respond. The mouse click is ignored.

ANNOTATION's Response

ANNOTATION can be configured to respond in two (or more) ways to the mouse messages. In one configuration, ANNOTATION requires the mouse to initially select an ANNOTATION TOOL. If no selection is done, ANNOTATION ignores mouse messages.

Selection is done by clicking the mouse over an image of the tool, as is commonly done in "paint" programs. ANNOTATION recognizes this tool selection, and then treats subsequent mouse clicks as data for drawing with the selected tool. For example, if a rectangle tool were selected, the next two mouse clicks would define the diagonal corners of the rectangle. (FIG. 4, later discussed, illustrates drawing a rectangle.)

Under the second configuration, a default tool, such as a pen, is automatically selected when in Annotation Mode. In this configuration, when the user tries to depress a calculator button (by clicking on it), the user (unintentionally) initiates drawing of a line, using the pen. When the user recognizes this, the user can terminate drawing of the line, in any of several known ways.

Therefore, in Annotation Mode, the invention either (a) responds to mouse input by initiating a default annotation, or (b) ignores the mouse input, because an annotation tool was not selected. Keyboard input from the user is treated the same way. Of course, other responses by ANNOTATION can be designed.

Tracking of Cursors

Each display shows a cursor whose position is controlled by the associated mouse. The invention replicates each cursor on all displays. Thus, in FIG. 3, with three mouses, there are three cursors on each display (only one is shown for simplicity).

Consequently, when one user moves a mouse, the corresponding cursor moves on all displays.

In general, the three cursors are distinguishable: each cursor identifies its owner, as by color, shape, inclusion of a label, or the like.

FIG. 4

Host Runs Application Program
Mode is "Annotation"
User Input is at Host Computer
User Attempts to Draw a Box over the Calculator This situation is quite similar to that of FIG. 3, except that, now, the user intends to draw an annotation, instead of intending to press a button, as in FIG. 3.

Assume that the user of the host computer draws a box over the calculator. (The box is shown overly large, for emphasis. It is preferred that the box not extend beyond the calculator itself.) The invention replicates the box on the remote computers. (The box is drawn using annotation tools, which are not shown.)

Figure 15:
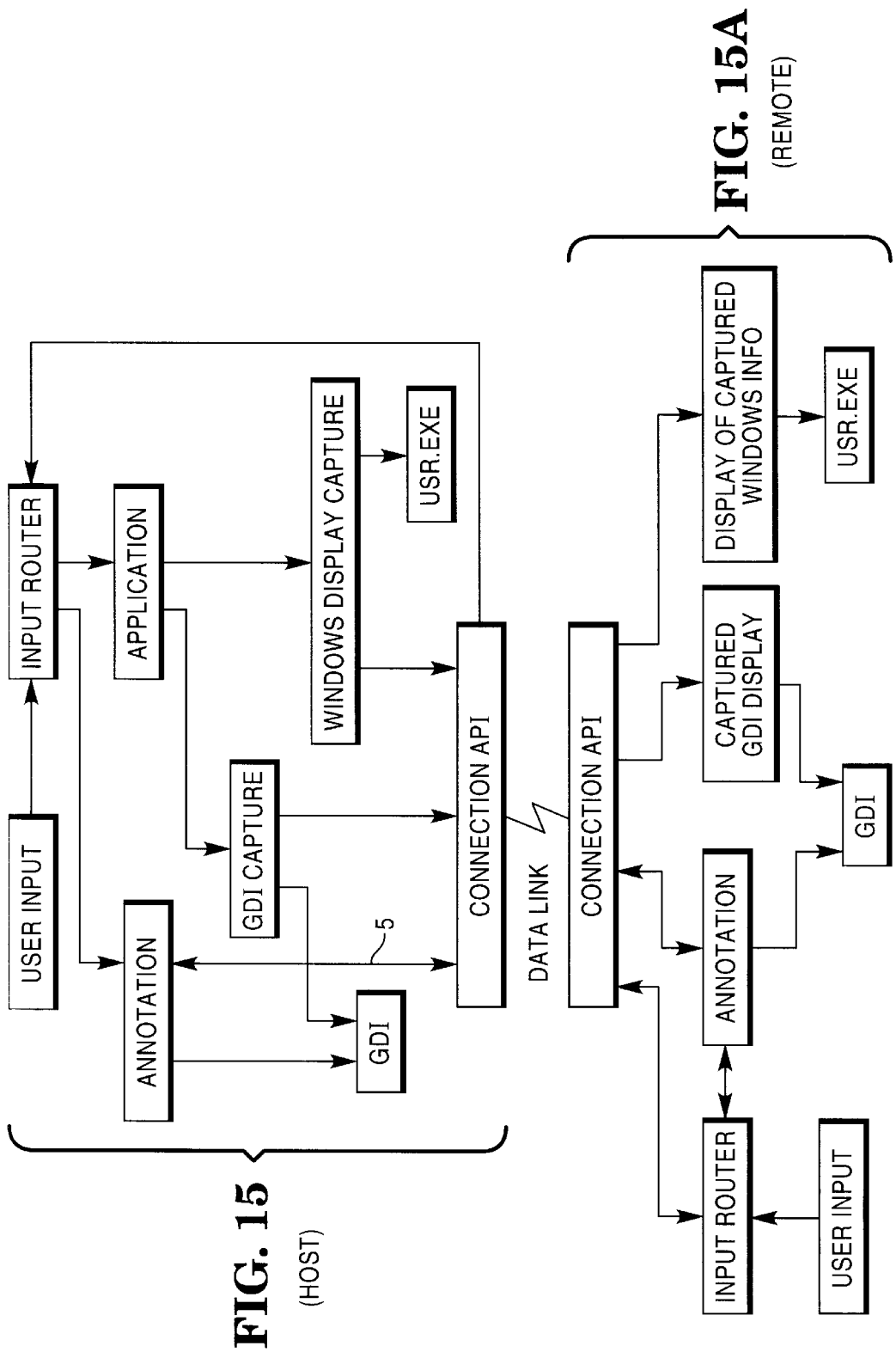

In terms of FIG. 15, INPUT ROUTER directs the logic flow to ANNOTATION. ANNOTATION calls the proper GDI functions to draw the box. Also, ANNOTATION sends "annotation messages" to CONNECTION API, which delivers the annotation messages to the Remotes.

ANNOTATION in FIG. 15A receives the annotation messages. This ANNOTATION block represents the logic executed at each remote computer. This ANNOTATION calls the proper GDI functions, via the block GDI.

"GDI" is an acronym for Graphical Device Interface. "GDI functions" are small programs, contained in a larger program of the GUI called GDI.EXE. A GDI function, when called, draws a specific graphic image, such as a circle, box, or text, based on subsequent input from the user. Other GDI functions perform other tasks, such as selecting pen widths.

GDI.EXE is a commercially available product. Technical details concerning GDI.EXE are contained in "Windows Software Development Kit," available from Microsoft Corporation, and in Programming Windows 3.1 by Charles Petzold (Microsoft Press, Redmond, Wash., 1992, ISBN 1-55615-395-3).

FIG. 5

Host Runs Application Program
Mode is "Application"
User Input is at Host Computer
User Attempts to Use Calculator The user of the Host moves the cursor over the calculator key "3" and clicks the mouse. The GUI generates a mouse message and places in into the queue. The invention reads the mouse message, and passes the message to the Application program (i.e., the calculator program), which responds by (1) showing that the key "3" is depressed and (2) drawing the numeral "3" in the calculator's display, using GDI calls. The Application program also records the fact that the user enters a "3," for its own internal operations.

The invention also intercepts the GDI calls made by the Application program in drawing the "3" in the calculator, and in drawing the depressed "3" button. The invention notifies the other computers of the GDI calls. The other computers replicate the Host display, by executing the same GDI functions. Greater detail concerning this GDI interception is given later, in the section entitled "General Considerations."

Thus, all users simultaneously see the user of the Host operate the calculator. (The action is not exactly simultaneous, because extremely short delays are involved. However, a human probably could not detect the delays if the Host and the Remote were operating side-by-side.)

In terms of FIG. 15, the INPUT ROUTER recognizes that the mouse messages should be directed to the Application program, and directs the logic flow to APPLICATION (i.e., the calculator program). APPLICATION (1) draws a depressed "3" key and (2) writes the numeral "3" in the calculator's display, by calling appropriate GDI functions.

However, the invention, via GDI CAPTURE in FIG. 15, captures the Application program's GDI calls, before they are executed. The invention does two things with the captured calls. One, it notifies the other computers of these calls, via the block CONNECTION API. This action leads to block CAPTURED GDI DISPLAY in FIG. 15A, which causes each Remote to execute the same GDI functions, as indicated by block GDI.

Two, the invention allows the GDI functions, called by the Application program, to be executed at the host, via the block GDI in FIG. 15.

Therefore, the invention captures GDI function calls made by the Application Program. The invention notifies the Remote computers of the captured calls, so that the Remotes can duplicate them. The invention allows the captured calls to be executed as intended on the Host.

FIG. 6

Host Runs Application Program
Mode is "Local Annotation"
User Input is at Host Computer
User Attempts to Operate Calculator Assume that in Annotation Mode, there is no default annotation tool given to the user. Under this assumption, if the user moves the cursor to a calculator button, and tries to "press" the button, the INPUT ROUTER in FIG. 15 passes the mouse message to the ANNOTATION block. Since the mouse click is not part of a valid annotation input sequence (no tool was selected), ANNOTATION draws nothing.

Further, the Remote computers do not show the movement of the cursor corresponding to the Host computer's mouse, as indicated, because line 5 in FIG. 15 does not send Annotation Messages to the other computers when Local Annotation is in force.

Further still, the calculator button is not re-drawn as a depressed button on the Host display, in response to the attempt to press it, because APPLICATION did not receive the mouse message. APPLICATION is responsible for drawing depressed calculator buttons.

If a default annotation is assigned to the user in Local Annotation Mode, the user's mouse click would initiate drawing by that tool. When the user realized the mistake, the user would terminate the drawing, in a known manner.

FIG. 7

Host Runs Application Program
Mode is "Local Annotation"
User Input is at Host Computer
User Attempts to Annotate Calculator Under these conditions, the INPUT ROUTER in FIG. 15 recognizes a valid attempt to perform annotation, as by drawing a box. The INPUT ROUTER directs the logic flow to the ANNOTATION block, which calls the proper GDI functions for drawing the annotation, namely, a box, as shown in FIG. 7.

Figure 7:
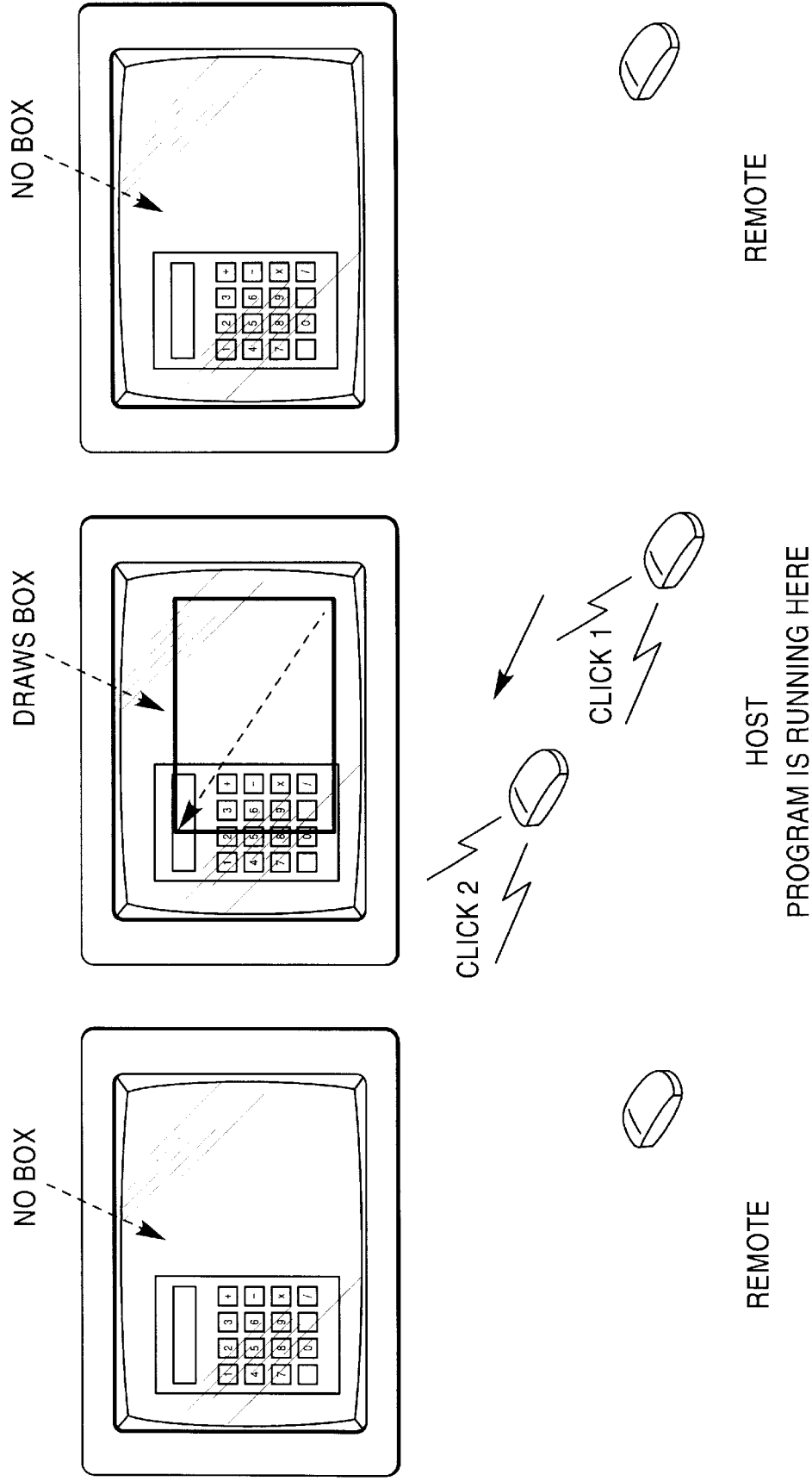
FIG. 7 illustrates how the invention responds when a host user attempts to annotate the calculator, when the invention is in Local Annotation mode.

However, because the annotation is local, no boxes are drawn on remote computers, as indicated in FIG. 7. No data is sent along data path 5 in FIG. 15.

Figure 8:
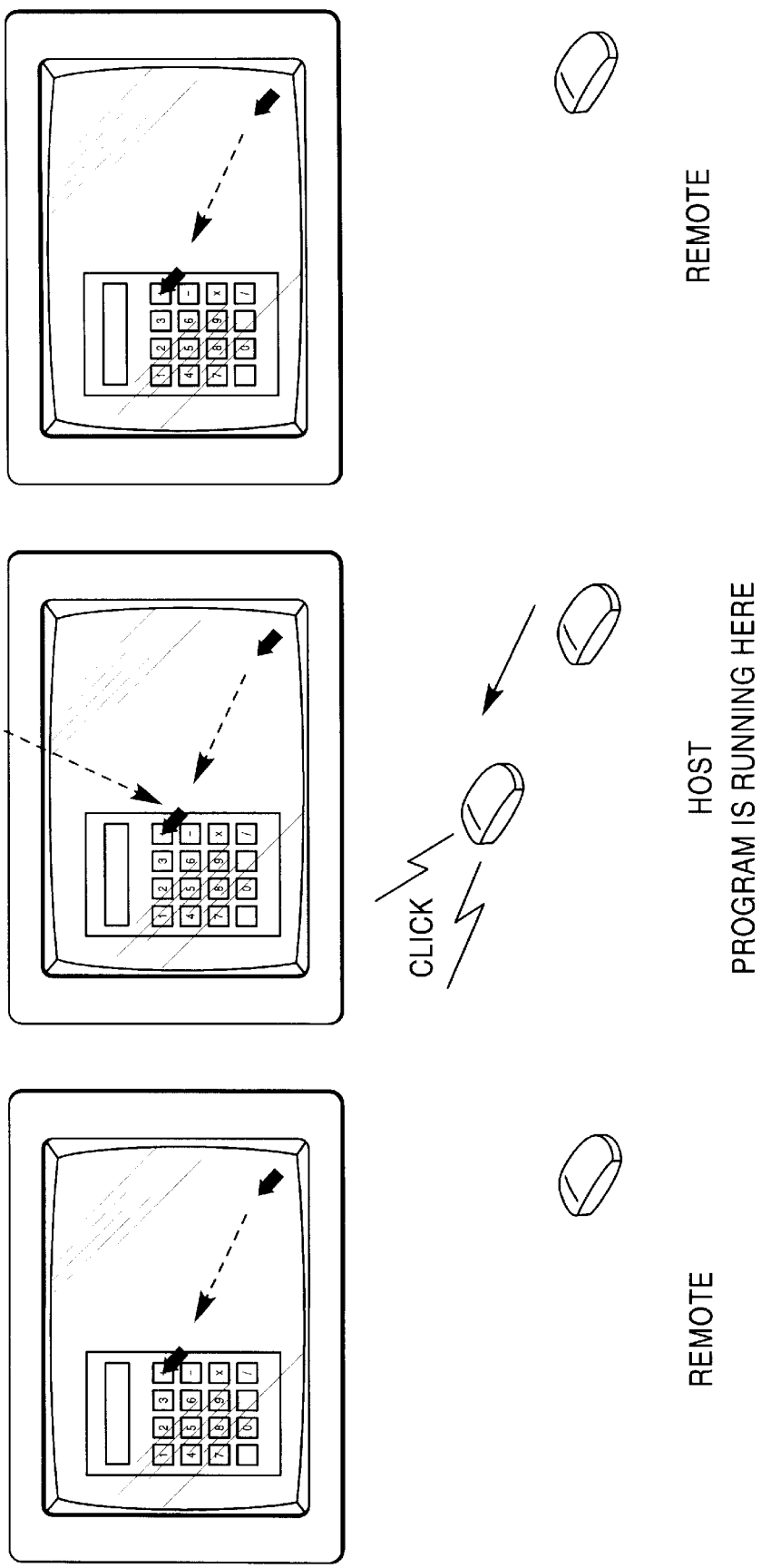
FIG. 8 illustrates how the invention responds to a host user when in View mode.

FIG. 8
Host Runs Application Program
Mode is "View"
User Input is at Host Computer
User Attempts to Operate Calculator As FIG. 8 indicates, the mouse click is ignored, and nothing happens at the Remotes.

In FIG. 15, the INPUT ROUTER reads the mouse message, but blocks it from APPLICATION, because the current mode is "view."

Figure 9:
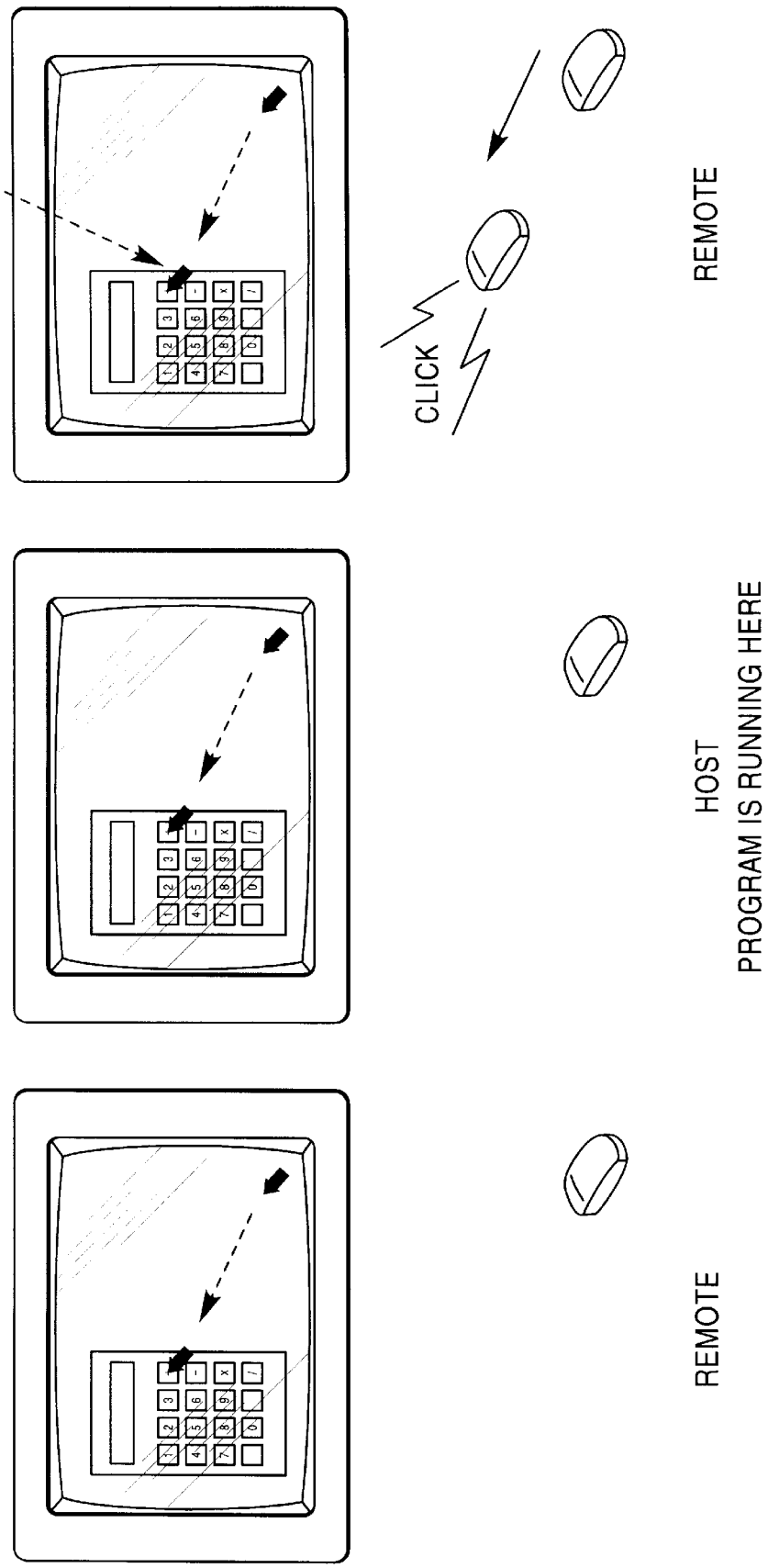
FIG. 9 illustrates how the invention responds when a remote user attempts to operate the calculator, when the invention is in Annotation mode.

FIG. 9
Host Runs Application Program
Mode is "ANNOTATION"
User Input is at Remote Computer
User Attempts to Operate Calculator Assume that the user moves the mouse cursor over a calculator button and clicks the mouse. The mouse click is ignored. The other computers (Host and the other Remote) show the motion of the user's cursor, but nothing else, because no tool has been selected.

In FIG. 15A, the INPUT ROUTER blocks the mouse message from reaching APPLICATION. The logic is directed to ANNOTATION, which draws a cursor on the user's Remote display, via block GDI. ANNOTATION also sends data to CONNECTION API, which directs the logic to ANNOTATION in FIG. 15. This ANNOTATION represents the annotation logic present on the two other computers: the Host and the other Remote. These ANNOTATION blocks draw cursors corresponding to the users cursor, at corresponding positions, via the GDI block in FIG. 15, which represents GDI function calls.

The Host can use one tool, such as a box-drawing tool, while a Remote can use a different tool, such as a circle-drawing tool.

Figure 10:
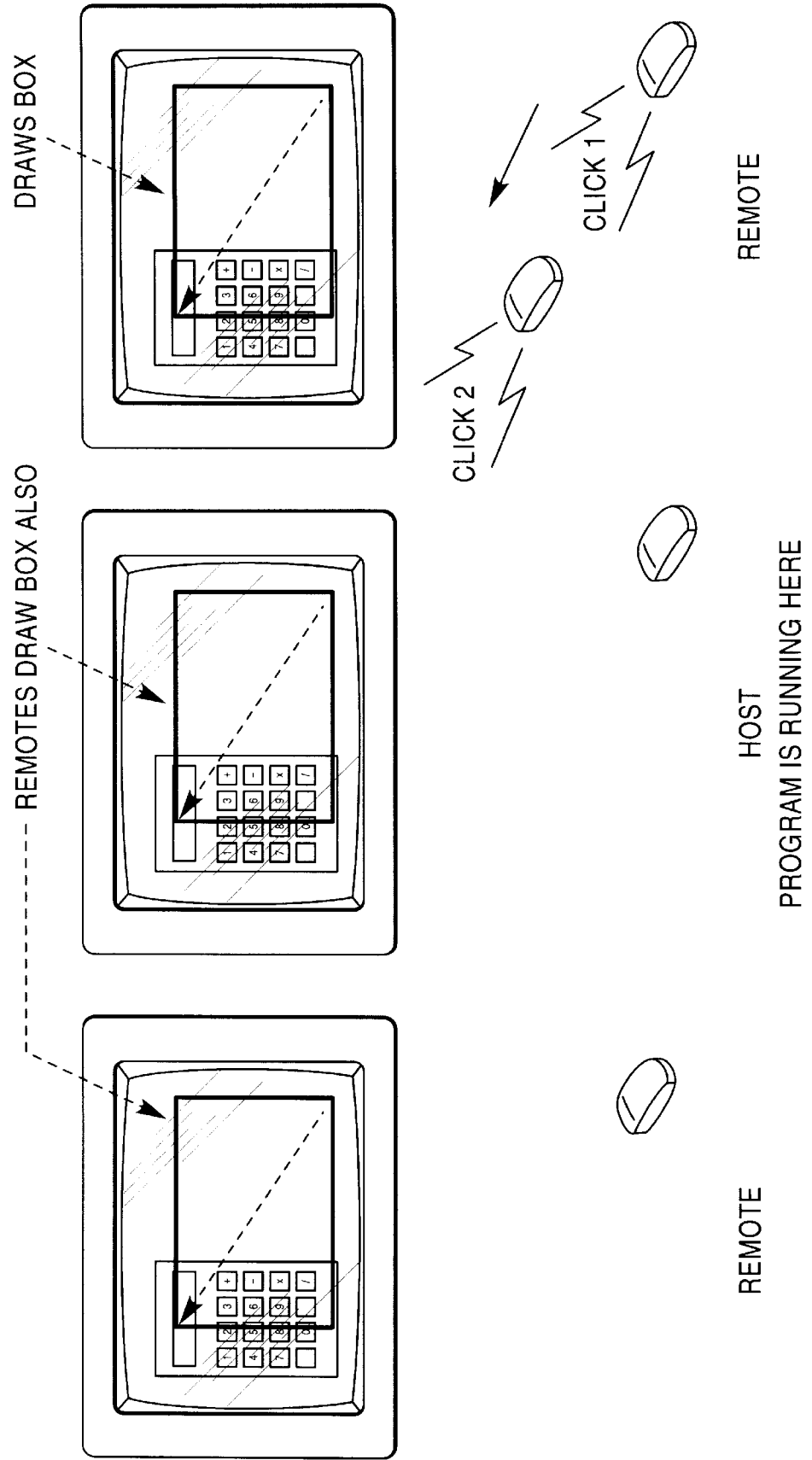
FIG. 10 illustrates how the invention responds when a remote user attempts to annotate the calculator, when the invention is in Annotation mode.

FIG. 10
Host Runs Application Program
Mode is "ANNOTATION"
User Input is at Remote Computer
User Attempts to Annotate Calculator Assume that the annotation is a box. A box is drawn on all displays. In FIG. 15A, the INPUT ROUTER at the user's Remote directs the mouse messages to the block ANNOTATION. ANNOTATION does two things. One, it calls the proper GDI functions to perform the annotation, namely, drawing the box.

Two, ANNOTATION sends annotation messages to CONNECTION API, which delivers the annotation messages to the other computers. However, one of these is the Host, and the other is a Remote. The logic at the Host reaches ANNOTATION in FIG. 15, and the logic at the other Remote reaches ANNOTATION in FIG. 15A.

Both of these ANNOTATION blocks cause the proper GDI functions to be called, to draw an annotation corresponding to the user's annotation. However, in the Host, logic path 5 is not taken at this time, because it is not necessary to replicate the Host's annotations at other computers.

FIG. 11
Host Runs Application Program
Mode is "APPLICATION"
User Input is at Remote Computer
User Attempts to Operate Calculator The reader is reminded that the calculator program is loaded only on the host, while a Remote user wishes to operate it.

The Remote user's INPUT ROUTER in FIG. 15A routes the mouse messages to CONNECTION API. The Host receives these messages, which are delivered to the Host's INPUT ROUTER in FIG. 15. The Host's INPUT ROUTER directs the messages to the block APPLICATION (i.e., to the Application program, namely, the calculator program), which does two important things.

The calculator program treats the messages as though they were issued by the Host's mouse, even though a Remote mouse caused them. The calculator program responds in its usual way, which includes (1) showing a depressed calculator button "3", (2) writing the numeral "3" in the calculator's display, and (3) performing its own internal computations when it learns that the user entered data (namely, the "3").

However, before the calculator program can execute (1) and (2) in the previous paragraph, the Invention first captures the GDI functions which the calculator program calls. This capture is illustrated in block GDI CAPTURE in FIG. 15.

During this capture, the Invention, in effect, does two things. One, it sends these GDI functions to CONNECTION API (for the other computers to use). At the user's Remote, CONNECTION API in FIG. 15A directs the GDI functions to CAPTURED GDI DISPLAY, which replicates the Host's display. Two, it causes the GDI functions to be executed at the Host (via block GDI in FIG. 15). Therefore, the general sequence of events is the following:

The Remote user attempts to press a calculator button.

The invention running on the Remote detects this attempt, and sends data to the calculator program running on the host. The data takes the form of messages, which the calculator program "thinks" come from the Host's mouse.

The calculator program performs as usual, and draws images on the Host display, via GDI calls.

The invention captures the GDI calls, and informs the Remotes of them.

The Remotes replicate the Host's window. The Remote user thus can remotely operate the calculator program running on the Host.

Summarizing in a different way: The invention generates mouse messages at the Host, based on mouse messages at the Remote. The calculator program (running on the Host) responds to the mouse messages as though they were generated at the Host. The invention intercepts the GDI calls made by the calculator program, and executes the same GDI calls at the Remote, thereby replicating the Host's display at the Remote.

Figure 12:
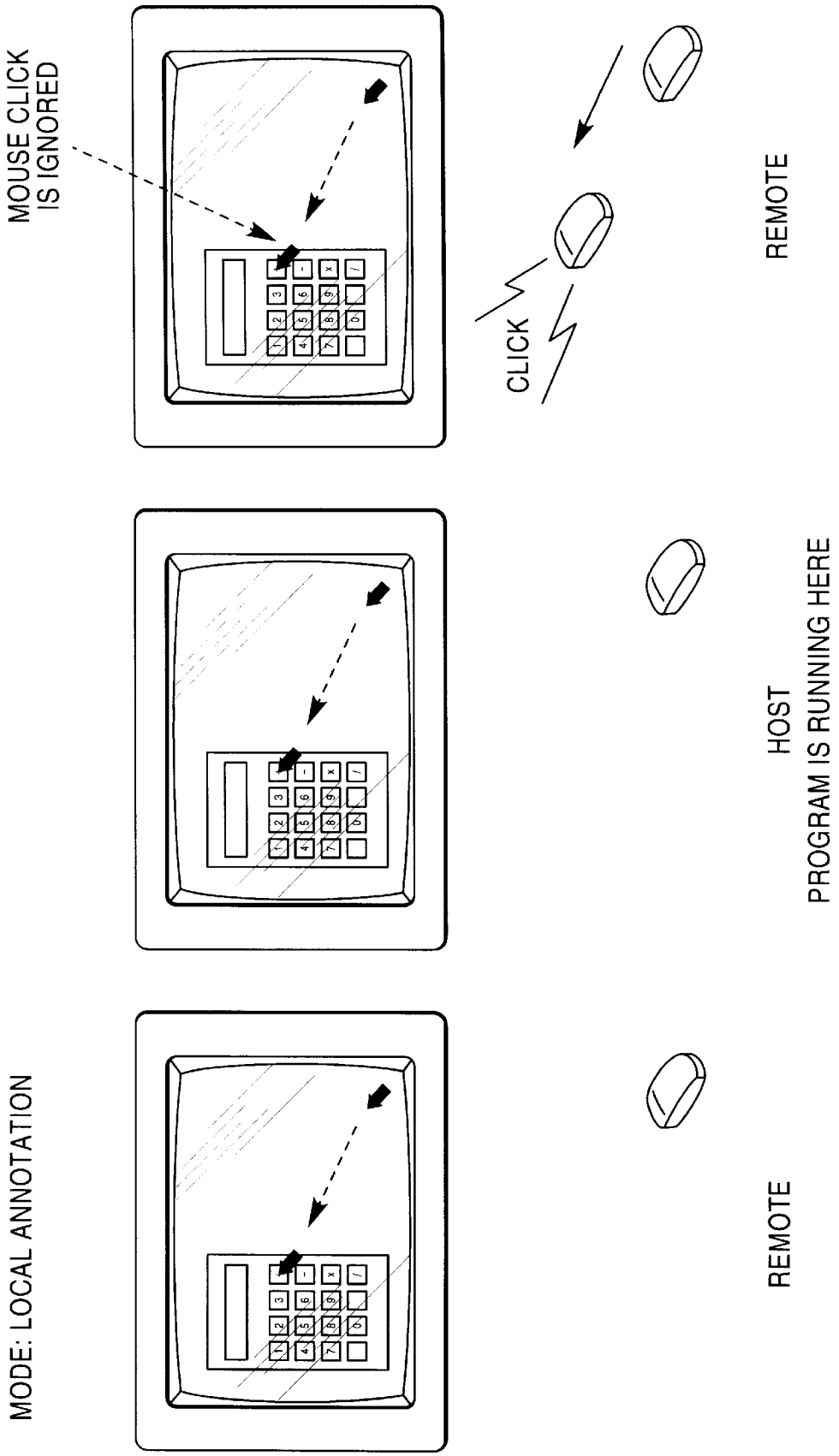
FIG. 12 illustrates how the invention responds when a remote user attempts to operate the calculator, when the invention is in Local Annotation mode.

FIG. 12
Host Runs Application Program
Mode is "Local Annotation"
User Input is at Remote Computer
User Attempts to Operate Calculator The user's mouse click is ignored. Nothing appears on the other displays in response to the mouse movement, because of failure to select a tool.

Figure 13:
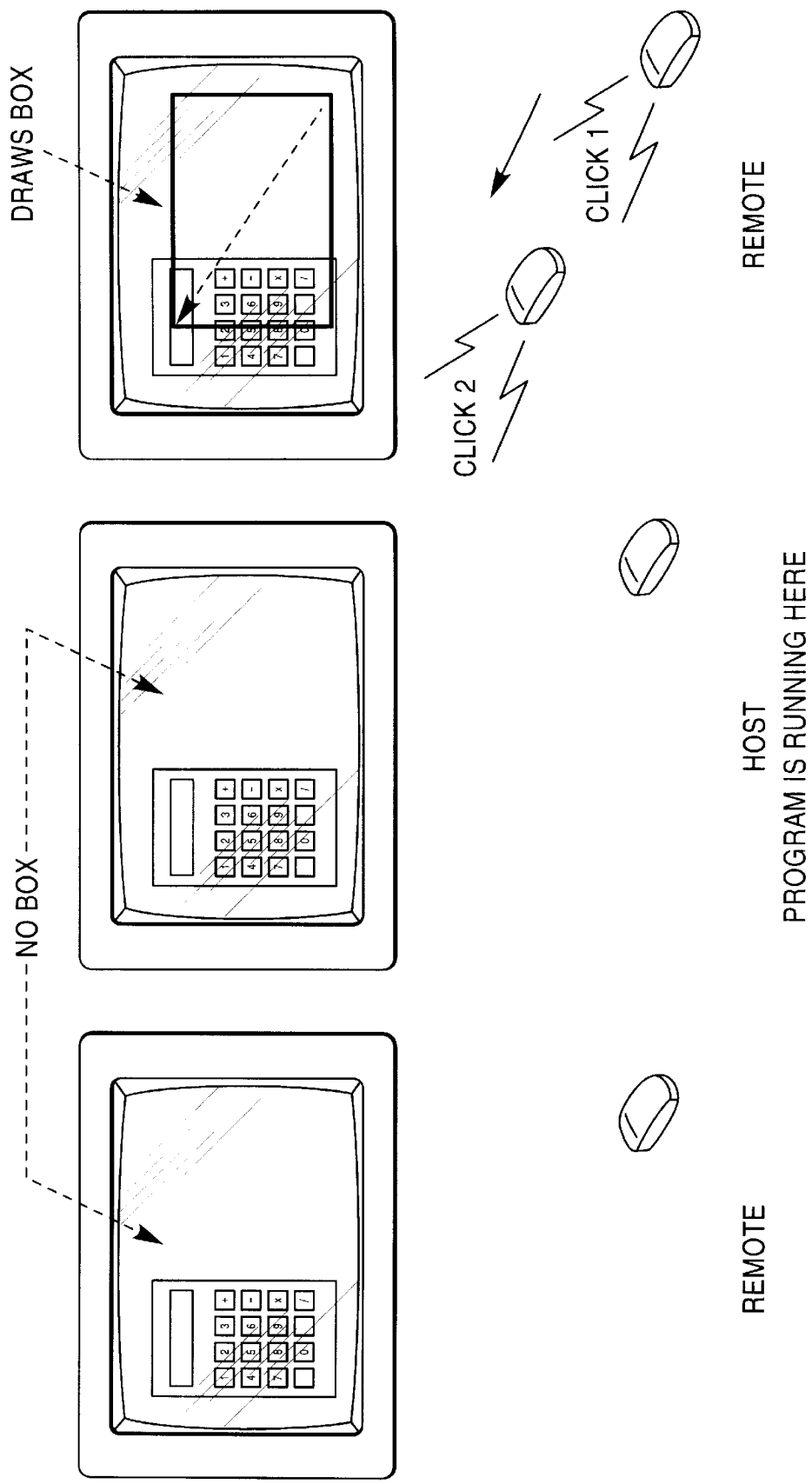
FIG. 13 illustrates how the invention responds when a remote user attempts to annotate the calculator, when the invention is in Local Annotation mode.
Figure 14:
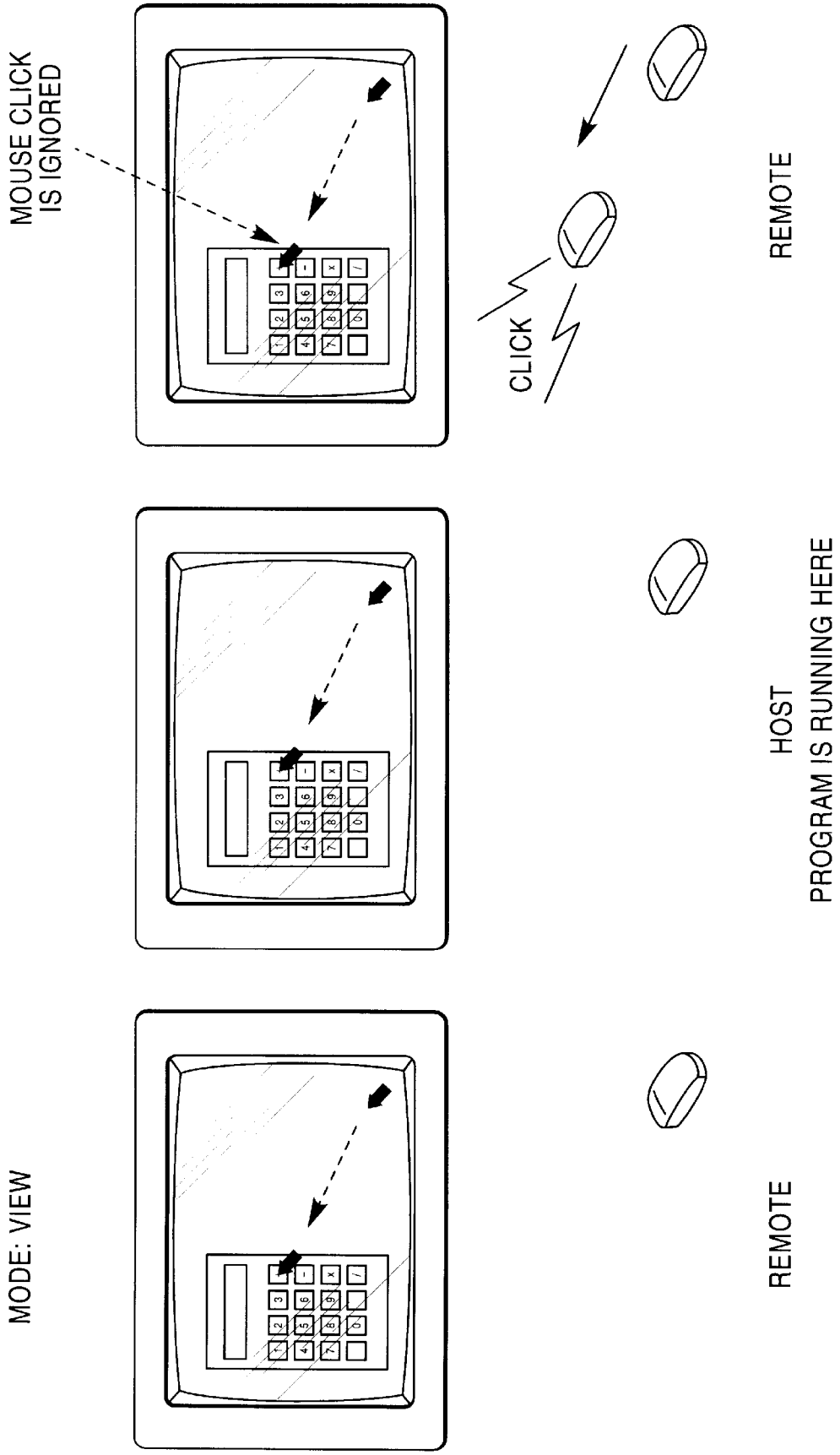
FIG. 14 illustrates how the invention responds to a remote user when in View mode.

FIG. 13
   Host Runs Application Program
   Mode is "Local Annotation"
   User Input is at Remote Computer
   User Attempts to Annotate Calculator
   The annotation is drawn on the user's display, as indicated. No annotation occurs on the other displays.
FIG. 14
   Host Runs Application Program
   Mode is "View"
   User Input is at Remote Computer
   User Attempts to Operate Calculator
   As indicated, the mouse cursor moves at the user's display, but the mouse click is ignored. Further, the other two displays do not show the movement of the user's mouse cursor.
General Considerations
   1. Different Programs Draw Different Parts of Overall Display. The displays are drawn using GDI functions. However, different parts of a display are drawn by different programs.
   Despite the fact that all these drawing operations are undertaken using GDI functions, GDI functions are not the exclusive medium of communication between computers for replicating the displays.
Annotation Involves One Type of Data
   Transfer Among Computers
Drawing by an Application Program
   Involves Another Type.
   For example, when a user performs annotation, the user's mouse messages are replicated, AS MESSAGES, at the other computers, via path 5 in FIG. 15. These replicated messages then cause the respective ANNOTATION blocks (at the other computers) to issue the proper GDI calls for drawing the annotation. That is, GDI calls are not sent directly from the user performing the annotation to the other computers.
   In contrast, when an application program causes a graphic image to be drawn on a display, the invention intercepts GDI calls (via GDI CAPTURE in FIG. 15) and causes the GDI calls to be replicated on the other computers.
Reason for Difference
   A major reason for the two different procedures (replicating mouse messages and replicating GDI calls) is that annotations are stored in memory at different locations than the display information.
   That is, returning to the calculator of FIG. 2, the Application program stores the image of the calculator in the following general way. Annotation data is stored by the invention; Application program data is stored by the Application program (at the host). Each image of a key is stored as data from which a GDI function can draw the key. The data includes information such as position, size, color, and so on. Each key includes an associated number. The number can be stored as a text character, with information as to position, size, font type, and so on.
   Annotation data is stored at a different location, but in the same general way.
   If either the annotation or the Application program needs bitmaps, the bitmaps are stored in a conventional, known manner, by the GUI.
   The invention combines the annotation images with the Application's images by the known technique of masking. That is, the invention, at a Remote, plays (or executes) the received GDI functions into a bitmap. The invention plays the received annotation information into a different bitmap. The two bitmaps are masked together.

The annotation data is kept separate from the application data so that, for example, a user can save an Application image, but without annotations. Alternately, a user can save annotation data alone, or save an annotated display.

As another example, keeping the annotation data separate facilitates drawing a display having no annotation data. If the annotation data were intermingled with the calculator image data, elimination of the annotation data would be difficult, if not impossible.

If GDI calls were transmitted exclusively (i.e., no message replication were undertaken), then extra effort would be required to construct annotation data for separate storage.

2. GDI Interception, or Capture. GDI interception can be understood as follows.

A. On start-up, the invention replaces the first five bytes of each GDI function with a JUMP instruction to a particular program, namely, Trap.GDI.

B. Trap.GDI gets the parameters for the desired graphics image (e.g., in the case of a box, the locations of the two diagonal corners) and calls the sub-program PkgDispCall. Trap.GDI also replaces the first five bytes.

C. PkgDispCall accepts the parameters from Trap.GDI and generates an object structure. This object structure is a block of data containing everything necessary for the other computers to draw the box.

For example, the object structure contains information as to size and position of the box. Further, the GUI draws images within a "context." The context includes things such as pen width, color, and other features. The invention tracks the contexts of the individual computers. If the context of the box drawn is different from the contexts of the remote computers, PkgDispCall includes data necessary for the other computers to create the correct contexts.

D. The object structure is shipped to the other computers, which then execute the same GDI functions.

E. The invention executes the original GDI functions.

3. Displays are not Transferred in Entirety. The displays are not replicated bit-by-bit. For example, the image of the calculator in FIG. 2 could be transferred between computers in bitwise fashion. If the calculator occupied a space of 200×300 pixels, then information regarding 60,000 (i.e., 200×300) pixels must be sent.

Instead, the particular calculator image shown in FIG. 2 is treated as eighteen rectangles, plus a text character for each of sixteen of the rectangles, giving a total of 34 objects. Each object requires parameters, such as size and position. The number of parameters is small, in the range of three to ten. Assuming ten parameters, then 340 pieces of data must be sent. Of course, the size of each piece depends on many factors, but a small number of bytes for each piece may be assumed.

Therefore, the invention reduces the 60,000 pieces of data needed for bitwise replication to 340 pieces maximum for object replication. Of course, some objects may take the form of bitmaps, and must be sent bit-by-bit. However, in general, bitmaps are expected to be rare. Further, it is expected that, in general, bitmaps, when sent, need be send only once.

Further, the object data is compressed when possible. That is, every transmission between computers is of compressed data, when possible. Compression is known in the art.

4. Types of Data Link. Communication among computers can take several forms. Commercially available networks, local and wide area, can be used. Commercially available ISDN telephone service, provided by local telephone companies, can be used. Modem communication can be used.

5. Prior Art Message Detection. There are commercially available packages which detect messages generated by the GUI in response to an input device. One such package is WINSIGHT, available from Borland International. However, it is believed that such packages do not inform remote computers of the messages.

6. Alternate GDI Capture. An alternate approach to the graphics capture described above is the following. The system-provided GDI is replaced by a separate procedure which processes GDI calls before calling the actual system GDI. The system GDI name is changed to prevent confusion between the two modules. The same technique is also used on USR.EXE to also capture GDI calls made through system-provided modules.

7. More than One Computer can Run Application Programs. A given computer can act as a Host for one program and a Remote for another. For example, one computer can run a word processing program. Another computer can run a CAD drawing program. Each is Host for its respective program.

Since the invention's software on each computer is identical, or substantially identical, all users can run either the word processing program or the CAD program, in the manner described above.

8. "Real" Cursors and "Pseudo" Cursors. There are two types of "cursor." Each GUI generates its own "real" cursor. The real cursor is not generated by GDI functions, but by an independent function in the GUI. The reader can view the cursor as a bitmap which the GUI moves in response to mouse motion.

In addition to the real cursor, which is controlled by the local mouse, the invention generates a "pseudo" cursor for each remote participant. The pseudo cursors are generated using GDI functions.

Sometimes a real cursor changes shape as the cursor moves. For example, it can take the form of an arrow when lying on a tool bar, and then change to a hand when lying on a client area. Sometimes this change is under the control of the Application program.

Therefore, if a Remote user is controlling an Application program running on a Host machine (as in FIG. 11), the Application program may change the cursor on the Host machine, but without using GDI calls. Consequently, the GDI capture of FIGS. 15 and 15A will be ineffective to replicate the changed on the Remote display.

To confront this problem, the invention watches for the functions which change the real cursor (e.g., the SetCursor command). The invention replicates the cursor change on the Remote computer.

One way is to execute the same SetCursor command. An alternate approach would be to change the Remote cursor by executing a proper sequence of GDI calls, or to draw a bitmap, when the Host cursor changes.

9. Entire Display not Replicated. The invention only replicates windows which the user of a display identifies. That is, the user can keep a workspace, such as a notepad, private during a conference. GDI calls use a task handle. If the task handle does not refer to a shared item, the GDI calls are not shared.

Figure 16:
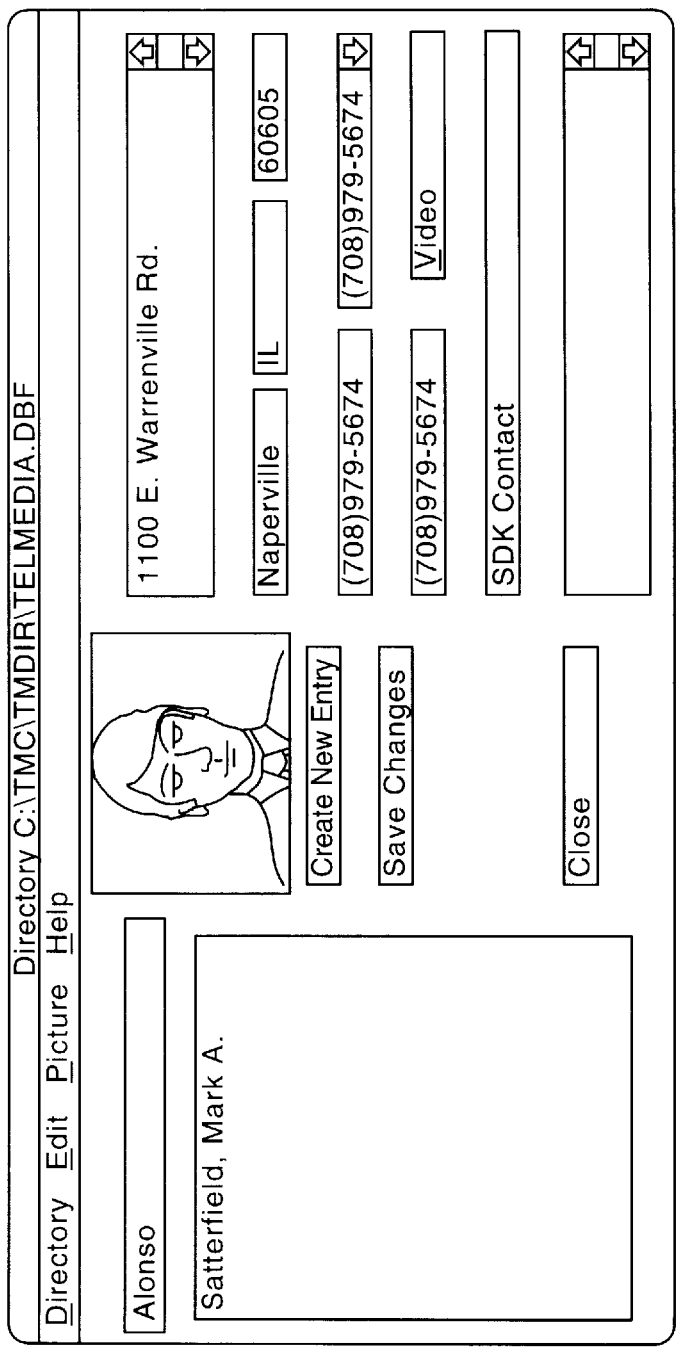
FIG. 16 illustrates a representative entry for a directory.

10. Direct Capture of Video into Telephone Database. The invention provides a convenient way to create a telephone directory having entries of the type shown in FIG. 16. An ordinary telephone directory provides a name, address, and telephone number for each telephone listed. Similarly, the invention provides this data, plus additional information, for each computer (or "station") which can establish a telephone conference with the computer at which the directory is located. Further, the invention holds the directory in a relational database. In a relational database, the information for each station is contained in a "record." Each record contains multiple fields. For example, the surname of the station owner occupies one field; the street address of the station occupies another field; the city occupies yet a third field; the telephone number of the station occupies a fourth field, and so on. In the relational database, a user can select a specific field, and order a search through that field alone. For example, the user can limit the search to city-fields, and search (by computer) for the words "Kansas City." The database responds by identifying all stations located in Kansas City. (The results would include all cities named Kansas City, regardless of state, unless the user further restricted the search to a particular state.)

The invention adds two unique features to the relational database, namely, (1) the ability to associate a picture with each entry and (2) the ability to generate the picture during a video conference. The picture will represent the primary person who uses the station represented by the entry, thus showing the person expected to be seen when a video conference is initiated. An example will illustrate one way to generate the picture.

EXAMPLE

Assume that two parties both use computers which are equipped with the invention as described in the Specification, and which runs the programs contained in the microfiche appendix.

One party, operating the "host" computer, makes a video call to the other. After the video link is established, each computer display shows a video image of the person located at the other computer.

The invention provides a mouse button on the host's display entitled "assign picture to directory." (The computer code files contained in the microfiche appendix are concerned with this function, and generate the mouse button.)

When the user presses this button, using the mouse, the invention captures the current video frame shown on the display, by capturing the contents of video memory. This capture is done by a Digital Video Driver, which is a computer program which uses local hardware, and which is called into action in response to the mouse button. This hardware is commercially available, and described later.

The Driver creates a Device Independent Bitmap (DIB), based on the contents of the video memory, and places this DIB into system memory. The Driver also stores this DIB into a temporary file located on a disc drive. DIB is a standard known in the art.

The primary reason for making two copies of the DIB is that another program processes the DIB data. This other program cannot be given access to the region of system memory holding the DIB, because such access would disrupt the Driver's operation.

This other program, termed a database agent, scales the temporary file to an image of size 120×90 pixels, and then translates the image into a 24-bit JPEG image. (JPEG is an acronym for Joint Photographic Export Group, and represents a known format. JPEG images are display-independent.) The 24-bit JPEG image contains eight bits for each of the three colors red, green, and blue.

The invention stores the JPEG image in the video image field of the database record associated with the remote station's directory entry. Now, a picture of the person at the other computer has been stored in the other computer's directory entry.

Hardware

The invention utilizes a capture card (also called a video chip set), which interfaces with an ISDN telephone link, to capture incoming video data and convert it into a form usable by the code contained in the microfiche appendix. This capture card is of the type called an expansion card, and is inserted into an expansion slot of a personal computer. Such cards are commercially available from NCR Corporation, having headquarters in Dayton, Ohio, under the designation TeleMedia Connection.

Important Points

One

The invention utilizes a relational database, and that term is well defined to computer scientists. A relational database contains a collection of data, termed a "record," for each of entry in the database. Each station has an entry, and thus a record. There are multiple stations.

(Of course, if a given computer is under the control of a single user, then the station's record is, in effect, that person's record. This record is analogous to a person's entry in a telephone directory, with the exceptions that (a) the invention contains more data for each record than does a telephone directory and (b) the invention's database is relational, whereas a telephone directory is not.)

Each record contains multiple fields, as discussed above. One field is allocated to a picture associated with the station corresponding to the record. This field contains the JPEG file. Because the database is relational, a user can pick a field, including the picture field, and run through the records from beginning to end. Thus, if a user forgets the name of a person whom the user wishes to contact, but remembers the face, the user can select the field containing the pictures, and examine the picture contained in each record.

Of course, performing a text search of the picture field is not possible, but is possible for the fields which contain text information.

Two

The process of loading one or more pictures into the database for every station will, of course, take a period of time. During this time, some records will contain pictures, and others will not. Further, it is likely that, for various reasons, some records will eventually contain no pictures. Still further, some records may contain multiple pictures. For example, a given station may be used by multiple persons. In this case, the records can be modified to contain multiple video-image fields.

Therefore, the invention does not require all records to contain video images, or pictures, in the picture field.

Three

The pictures need not be obtained exclusively in the manner described above. One alternate is to generate a JPEG image for a given record directly. JPEG images can be generated by digitizing a photograph, and processing the digitized data using known procedures. The JPEG image is stored into the video-image field of the proper record in a known manner. The JPEG image, or an equivalent image, can be called a digitized image, or digitized picture, of the person associated with the record.

Four

The term "directory" should not be confused with the identical term, used in the computer art, but given a different meaning. The latter "directory" refers to a list of files contained on a disc drive; it is more like a table of contents. The invention's "directory" is not such a list of file names. The invention's directory is more like a catalog which lists stations to which a computer can establish a video conference.

Five

The invention allows a user to generate a photo album, which also contains a telephone-directory-type listing for each photo. The term "photo" is a shorthand notation for "photograph," which means, literally, "light image." The term is not limited to paper images generated by a chemical photographic process.

Further, the photo-album/telephone directory can be said to contain "pictures," even though the pictures are not directly visible to humans. Restated, the stored data from which the 120×90 image is generated can be called pictures, or picture-data.

Six

The invention allows direct capture of the video stream into a relational database. In contrast, prior-art devices, such as frame-grabbers, store a captured video image into a separate file.

Seven

The invention is not limited to video conferencing systems. The invention can be used in a non-conference-capable computer, to generate a photo-telephone album, or a collection of photos for other purposes. Further, the invention can be used in a conference-capable computer, for generating a photo-telephone album, or other collection of photos, for non-conference purposes.

Restated, the invention can be viewed as a vehicle for video capture, but for purposes not necessarily associated with video conferencing.

Eight

GDI calls are transmitted on Multipoint Communication Services (MCS) channels. A description of MCS channels and how to set them up is contained in TSS standard T.122. The video data stream is transmitted according to the CCITT H.221 standard. Other relevant standards are CCITT T.120 through T.125, G.711, G.722, H. 261, G.728, and H.320. These standards are incorporated by reference.

11. Host Can Transmit Both GDI Calls and Video Data. All Computers Display GDI-Generated Images, Together with Video, On Single Display. The invention uses a commercially available data channel, such as those described herein, to transmit both GDI calls, which are used to replicate images, and video data. Video data can be viewed as a bitmap. Commonly, video represents a moving picture, which is displayed in the form of an image which changes at a frame rate such as 25 frames/sec. Thus, the video stream can be viewed as bitmaps which are transferred at the rate of 25 frames per second (although compressed for transmission).

The commercially available channels accommodate such transfers of data, together with video. The GDI calls are considered data.

An example will illustrate one style of operation.

EXAMPLE

Each computer, host as well as remotes, has an associated video camera, which continually takes a video picture of the user of that computer. The invention makes the video data available to all the computers participating in the conference. Thus, each participant receives data from which a real-time, moving picture of the other participants can be generated, and displayed on the participant's display.

At the same time, the invention is intercepting and replicating GDI calls, to generate the rest of the displays. The computer code in the attached microfiche appendix allows as many as two real-time video windows to be displayed. The remote computers' displays are thus generated, based on GDI calls received, together with video data received. If the remotes' displays show text, the text is actually drawn from GDI calls, and not from a text character generator.

Therefore, the invention allows simultaneous (a) video conferencing, plus (b) sharing of an application program. The displays of the computers show up to two video windows (which provide video conferencing) and the replicated display of the application program (which provides the sharing).

Further, the simultaneous accomplishment of these two functions is attained by using commercially available telephone channels.

12. Preferred Data Channel. The preferred commercially available telephone channel is the ISDN (Integrated Services Digital Network) Basic Rate Interface. This interface has been defined by the Consultative Committee on International Telephone Telegraph (CCITT), which is the branch of the United Nations charged with setting international telephony standards.

This channel can transmit 128,000 bits (not bytes) per second in both directions, simultaneously. This channel capacity has been found to impose no significant limits on the simultaneous sharing of (a) applications running on the personal computer with (b) video conferencing windows.

13. Any Application can be Shared. It is significant that any application can be shared which can run on the GUI. Restated, sharing is not limited to custom applications written specifically for the purpose of sharing. And, as discussed above, the sharing requires the shared program to run only on a single computer; copies of the shared program need not run an two computers at once.

14. re: GDI Calls. The GDI calls can be generically referred to as "graphics function calls," or "graphics calls." One important characteristic of these calls is that they contain significantly less information than the pixel map of the image which they cause to be drawn.

For example, consider a graphics function call which orders a graphics program to draw a colored box, which is 100×100 pixels (which is 2×2 inches on a display having 50 pixels per inch). A bitmap of this box must contain information for 100×100, or 10,000, pixels. On a color display, if one byte is used for color, and frequently, more than one byte is used, then 10,000 bytes must be transmitted to tell a remote computer to draw this box.

In contrast, with the graphics function calls, the information transmitted is, essentially, the size of the box, its location, whether it is filled or not, and some color information. This represents far fewer bytes than 10,000.

15. Elaboration of "-Share." Sharing of an application includes one or more of the following features. The program runs on a single computer. The display it generates is made available to other computers. Input can be fed to the program from other computers.

All features need not necessarily be present for sharing to occur. For example, a given program may not require input; it may generate displays only.

16. Invention in Kit Form. One form of the invention is a kit, for connection to a small computer. The kit includes one or more of the following items:

The capture card, identified above, which receives video data, from a video camera and the communication channel (the ISDN line).

A video camera, which connects to the capture card; and The computer code contained in the microfiche appendices of this Specification, and those incorporated by reference.

The kit may also include circuitry for interfacing with ISDN channels. Some types of commercially available telephones include such circuitry, so that a person already in possession of such a telephone does not need this ISDN interface.

17. Computer Code. Computer code in microfiche form is attached. A description of files contained therein is contained in the following Table. A description of some files referenced in the discussion above may be located in the parent application. This Table describes a specific embodiment of the invention which uses the following terms and phrases:

"TeleGraphics" is a trade name used to describe the overall collaborative video conferencing system described in the subject case and those cross-referenced herein. "TeleMedia Manager" is a trade name used to describe a specific implementation of a display window having controls to allow the user of the computer to establish and control a collaborative video conference.

"Annotation toolbar" refers to a region of the TeleMedia Manager which has controls for annotating a shared image.

"TeleMedia Connection Board" refers to a capture card (also called a video chipset), utilized by the invention, which interfaces with an ISDN telephone link, to capture incoming video data and convert it into a form usable by the code contained in the microfiche appendix. This capture card is of the type called an expansion card, and is inserted into an expansion slot of a personal computer. Such cards are commercially available from NCR Corporation, having headquarters at 1700 South Patterson Blvd, Dayton, Ohio, 45479 under the designation TeleMedia Connection.

TABLE

| Playback Side (Remote): | |
|---|---|
| dibddb.c | Functions responsible for the translations of Device Independent Bitmaps to a Device Dependent format that the GDI Playback machine (the remote) understands |
| gdiobjpy.c | Functions responsible for the creation of GDI objects from object description data that is transmitted from the host machine |
| globals.c | Primary global variable header file |
| globals.h | Secondary global variable header file |
| linklist.c | Functions responsible for the creation and maintenance of the linked lists required for the playback of the GDI calls |
| proto.h | Prototypes for all GDI Playback calls |
| tmplay.c | Code responsible for all exported functions Functions which recreate all GDI calls from the call description data |
| tmplay.h | GDI Playback include file which contains the prototypes for our exported API |
| tmplayp.h | Private structures required for GDI Playback |
| tmplay.def | Module definition file used to create the tmplay executable file |

| Capture Side (Host): | |
|---|---|
| cache.c | Functions which discern whether an object has to be re-transmitted to the remote machine, or whether the currently cached copy can be used |
| dibddb.c | Functions which change all Device Dependent bitmaps to Device Independent bitmaps to guarantee device independence for GDI Capture |
| gdiobjcp.c | Functions for retrieving GDI objects out of the GDI default data heap |
| globals.c | Primary global variable header file |
| globals.h | Secondary global variable header file |
| intercpt.asm | Functions which hook the GDI and Windows calls that must be intercepted |
| linklist.c | Functions to create and maintain the various linked lists used for identifying tasks, objects, Device Contexts, etc. |
| package.c | Functions to queue up GDI Capture remote data packets for efficient utilization of the connection medium |
| proto.h | Prototypes for all GDI Capture calls |
| remote.c | Functions responsible for generating non-graphic remote |

TABLE-continued

| | |
|---|---|
| | machine manipulations |
| tmcapt.c | Functions responsible for all exported functions, as well as the state tracking of the window positions |
| tmcapt.h | GDI Capture include file which contains the prototypes for our exported API |
| tmcaptp.h | Private structures required for GDI Capture |
| trap.c | Function which parse the calls that we are intercepting |
| tmcapt.def | Module definition file used to create the tmcapt executable file |

Include Files Common to both Playback and Capture:

| | |
|---|---|
| overlay.h | This file defines constants and data structures used throughout all the source files for the digital video driver. |
| tmdgvcfg.h | Definitions and data structures used by the tmdgcfg.cpp file for configuration of the digital video driver. |
| iic.h | Definitions and data structures used by the iic.cpp file for initialization and programming video input for the video overlay circuits in the TeleMedia Connection board. |
| tmdgv.rc | Data tables and strings used for the Microsoft Media Control Interface for digital video drivers and the configuration menus and dialogs used by the installation and configuration code of the digital video driver. |
| tmdgv.dlg | Data tables and strings used for the Microsoft Media Control Interface for digital video drivers and the configuration menus and dialogs used by the installation and configuration code of the digital video driver. |
| tmdgv.cpp | The main code module for the TeleMedia Connection Digital Video Driver. This code supports the application interface defined by the Microsoft Media Control Interface for digital video drivers and the interface to the video hardware programming functions. The key functions used for capturing the video stream used for this patent application is CaptureStillImage and associated functions called from this function. |
| video.cpp | The functions in this file initialize and modify the operation of the video overlay hardware on the TeleMedia Connection board. |
| iic.cpp | These functions initialize and program the operation of the input circuitry to the video overlay hardware. |
| tmdgvcfg.cpp | The configuration and installation of the digital video driver's user interface are contained in this file. |
| vgamem.asm | Assembly language routines used to access the video memory on the TeleMedia Connection board. The readvram function is used to retrieve video data from the video overlay hardware. |
| gdiobj.h | This file contains the data descriptions for the GDI objects |
| pkgtags.h | This file contains the data descriptions for the transmissions id's of the intercepted calls |
| udwgdi.h | This file contains some unimportant data structures not documented in standard windows documentation |
| makefile | File used to build sources to obtain executable object code |
| annot.h | Identifiers for annotation messages |
| | Limits on the number of machines and applications that can be involved in a collaboration session |
| | Definitions of data structures containing information about shared applications |
| | Assorted prototypes for draw.cpp and sautil.cpp functions |
| appwnd.cpp | Functions to manage the window on the remote side in which the shared application is displayed |
| bitmap.cpp | Functions that do assorted bitmap manipulations |
| draw.cpp | Functions that manipulate, save, and restore the bitmaps which represent the application windows and the annotation windows |
| | Functions that impose annotations over specified windows on the screen |
| | Functions that update the annotation toolbar selections on the user's PC and on other PCs in the conference |
| | Functions that draw annotations into the annotation bitmaps |
| | Functions that package and send data to the other PCs in the conference |
| filter.cpp | Filter functions for messages. These function intercept messages in the system to determine whether they are |

TABLE-continued

| | |
|---|---|
| | messages that are needed by annotation functions or remote control functions. The functions also do some processing on the intercepted messages. |
| hooks.cpp | Hooks to install the filter functions in the system |
| hooks.h | Data structures needed to install the filter functions |
| inputrtr.cpp | Functions that implement the remote control functionality (simulate mouse and key events on the host that the remote created) |
| | Structures for cursors (caching of cursors, etc.) |
| | Functions to ship host's cursor across to remote if the cursor is not a standard Windows cursor) |
| | Functions to initialize input router library |
| | Functions to intercept keyboard messages |
| | Windows procedures for the input router and the shared application window |
| | Functions to handle annotation messages and user input messages that are meant for the host's shared application |
| | Functions to translate host's screen and window coordinates to those of the remote computer and vice versa |
| inputrtr.h | Data structures to support the message handling function of inputrtr.cpp |
| | Data structures to support remote control functions |
| main.cpp | User and library clean up and initialization functions |
| mousemsg.cpp | Filter functions for mouse messages (as opposed to keyboard messages) |
| sautil.c | Functions to retrieve or the index of an application in the array of shared applications that the program maintains and functions to add an application to that array (similar functionality for annotation bitmaps and masks is also in this file) |
| | Functions for changing between applications so as to indicate which application is current |
| | Functions for altering the permissions and modes of the host and remotes |
| | Functions for changing the size and position of the remote shared application windows |
| send.cpp | Functions to package and send data across the communications channel |
| status.cpp | Functions to update the messages that appear in the status bar or a window |
| telegraph.h | Assorted prototypes and data structures used to display the recreation of the image of the shared application |
| tools.cpp | Functions used to create the functionality of the annotation toolbar (drawing on the annotation bitmap, changing the property of the selected tool - e.g. color - changing the selected tool in the appropriate data structures, etc.) |
| trans.cpp | Functions to translate coordinates between host and remote |
| wbproc.cpp | Functions to display the "whiteboard" |
| | Functions to allow annotation to occur on the "whiteboard" |
| anntb.c | Functions to display the annotation toolbar (the bottom half of the TeleMedia Manager screen) |
| anntb.h | Data structures and prototypes needed to display the annotation toolbar |
| annvid.c | Functions to display video when it is inserted in the annotation toolbar |
| annvid.h | Data structures and prototypes needed by annvid.c |
| televid.c | Functions to display the portion of the annotation toolbar that appears under the video portion of the toolbar |
| televid.h | Data structures (named identifiers) and function prototypes needed by televid.c |
| tmscreen.c | Functions to support the TeleMedia Manager screen and controls (e.g. the buttons). The functions handle the buttons, the changing of the button states, etc. |
| umb.c | Functions to display the main portion of the TeleMedia Manager screen |
| | Contains the main program for the TeleMedia Connection and its window procedure |
| umb.h | Named identifiers and function prototypes needed by umb.c |
| vidwin.c | Functions to interface with the video device driver |
| vidwin.h | Prototypes and data structures needed to interface with the video device driver |

Numerous substitutions and modifications can be undertaken without departing from the true spirit and scope of the invention. What is desired to be secured by Letters Patent is the Invention as defined in the following claims.

We claim:

1. A computer system, comprising:
   a) multiple remote computers at different locations, each having a display;
   b) substantially identical remote program means, running on each remote computer, for communicating with one host application program running on a host computer; and
   c) means for allowing a user of each remote computer to simultaneously:
      i) hold a video conference; and
      ii) operate the remote program means executing on the remote computer, the remote program enabling the remote computer to:
         1) communicate with the host application program;
         2) provide program input to the host application program;
         3) draw annotation images on the display of the remote computer; and
         4) communication between the remote program and the host program to selectively replicate the annotation images on the displays of the other remote computers.

2. A system according to claim 1 in which communication among the computers can by accomplished by two data channels having a total capacity not exceeding 128,000 bits per second in both directions, simultaneously.

3. A computer system, comprising:
   a) two or more computers at different locations, each capable of running a substantially identical message-driven, multi-tasking, operating environment;
   b) substantially identical program means, running on each computer, for communicating with one host application program running on a host computer; and
   c) means for allowing users of the computers to simultaneously:
      i) hold a video conference; and
      ii) operate the substantially identical program means executing on the computer, the program means enabling the remote computer to:
         1) communicate with the host application program;
         2) provide program input to the host application program;
         3) draw annotation images on the display of the remote computer; and
         4) communicate between the remote program and the host application program to selectively replicate the annotation images on the displays of the other remote computers.

4. A kit for connection to a user's computer, comprising:
   a) a video camera;
   b) a capture card for receiving
      i) video data from the video camera, and
      ii) video data from a communication channel; and converting both video data into forms usable by the computer;
   c) remote program means for communicating with one host application program running on a host computer; and
   d) program means for allowing a user of the computer to simultaneously:
      i) hold a video conference with another computer; and
      ii) operate the remote program means, the remote program means enabling the computer to:
         1) communicate with the host application program;
         2) provide program input to the host application program;
         3) draw annotation images on the display of the computer; and
         4) communicate between the remote program and the host program to selectively replicate the annotation images on the displays of the other remote computers.

5. A system for communicating with other computers by a communication channel, comprising:
   a) a computer equipped with
      i) a message-driven, multi-tasking, operating environment;
      ii) video camera means for feeding the computer with data representing a visual image; and
      iii) means for interfacing with the communication channel;
   b) remote program means for communicating with one host application program running on a host computer; and
   c) program means for allowing a user of the computer to simultaneously:
      i) hold a video conference with other computers so equipped; and
      ii) operate the remote program means, the remote program means enabling the computer to:
         1) communicate with the host application program;
         2) provide program input to the host application program;
         3) draw annotation images on the display of the computer; and
         4) communicate between the remote program and the host program to selectively replicate the annotation images on the displays of the other remote computers.

* * * * *

UNITED STATES PATENT AND TRADEMARK OFFICE
CERTIFICATE OF CORRECTION

PATENT NO. : 5,872,923
DATED : February 16, 1999
INVENTOR(S) : William C. Schwartz et al.

It is certified that error appears in the above-indentified patent and that said Letters Patent is hereby corrected as shown below:

Column 19, line 22, delete "communication" and substitute --communicate--.

Signed and Sealed this

Ninth Day of November, 1999

Attest:

Attesting Officer

Q. TODD DICKINSON

Acting Commissioner of Patents and Trademarks